United States Patent
Ryoo et al.

(10) Patent No.: US 12,429,600 B2
(45) Date of Patent: Sep. 30, 2025

(54) GLOBAL NAVIGATION SATELLITE SYSTEM (GNSS) SIGNAL OUTPUT SYSTEM SUPPORTING GNSS SHADED AREAS

(71) Applicant: IDCITI.COM, Incheon (KR)

(72) Inventors: Jihoon Ryoo, Incheon (KR); Hongjin Lee, Incheon (KR); Seonghoon Park, Incheon (KR)

(73) Assignee: IDCITI.COM, Incheon (KR)

( * ) Notice: Subject to any disclaimer, the term of this patent is extended or adjusted under 35 U.S.C. 154(b) by 273 days.

(21) Appl. No.: 18/147,187

(22) Filed: Dec. 28, 2022

(65) Prior Publication Data

US 2023/0204788 A1 Jun. 29, 2023

(30) Foreign Application Priority Data

Dec. 29, 2021 (KR) .................. 10-2021-0191864

(51) Int. Cl.
*G01S 19/11* (2010.01)

(52) U.S. Cl.
CPC .................... *G01S 19/11* (2013.01)

(58) Field of Classification Search
CPC ....................................... G01S 19/11
USPC .................................... 342/357.48
See application file for complete search history.

(56) References Cited

U.S. PATENT DOCUMENTS

2007/0063893 A1 3/2007 Horton et al.
2022/0137231 A1* 5/2022 Lavi ............... G01S 19/48
342/357.31

FOREIGN PATENT DOCUMENTS

| KR | 2008-0045700 A | 5/2008 | |
| KR | 2017-0024297 A | 3/2017 | |
| KR | 2021-0073130 A | 6/2021 | |
| WO | WO-2010088290 A1 * | 8/2010 | ........... G01S 19/45 |

OTHER PUBLICATIONS

Office Action dated Nov. 9, 2023, in Korean Application No. 10-2021-191864.

* cited by examiner

*Primary Examiner* — Harry K Liu
(74) *Attorney, Agent, or Firm* — Knobbe, Martens, Olson & Bear, LLP

(57) ABSTRACT

A global navigation satellite system (GNSS) signal output system is proposed. The system may include a signal generating apparatus configured to receive GNSS navigation information and generate, based on the GNSS navigation information, a pseudo GNSS signal corresponding to a current time and a current location. The system may also include a plurality of leakage cables including a plurality of signal leakage slots. The system may further include a plurality of signal output apparatuses configured to receive the pseudo GNSS signal from the signal generating apparatus and output the pseudo GNSS signal to at least one of the plurality of leakage cables. The plurality of signal output apparatuses may be arranged apart from each other.

13 Claims, 16 Drawing Sheets

GLOBAL NAVIGATION SATELLITE SYSTEM (GNSS) SIGNAL OUTPUT SYSTEM SUPPORTING GNSS SHADED AREAS

CROSS-REFERENCE TO RELATED APPLICATION

This application is based on and claims priority under 35 U.S.C. § 119 to Korean Patent Application No. 10-2021-0191864, filed on Dec. 29, 2021, in the Korean Intellectual Property Office, the disclosure of which is incorporated by reference herein in its entirety.

BACKGROUND

Technical Field

One or more embodiments relate to a global navigation satellite system (GNSS) supporting GNSS shaded areas.

Description of Related Technology

A global navigation satellite system (GNSS) is a system for calculating location information of a receiver based on information received from a satellite. Examples of a GNSS include the United states' global positioning system (GPS), Russia's global navigation satellite system (GLONASS), the European Union's Galileo, China's BeiDou, Japan's quasi-zenith satellite system (QZSS), and the Indian regional navigation satellite system (IRNSS).

SUMMARY

One or more embodiments include a system for providing a global navigation satellite system (GNSS) signal in a space (e.g., in an indoor environment or an underground facility) where a GNSS signal may not be received because line of sight (LOS) communication with an artificial satellite is impossible due to an obstacle, such as a roof.

Also, one or more embodiments include an apparatus and method of providing a GNSS signal in an indoor environment by using a general-purpose GNSS module, without changing a configuration of a receiving end of a client apparatus.

Also, one or more embodiments include an apparatus and method in which, because a Doppler shift of an actual satellite signal is reflected when a pseudo GNSS signal is provided, during conversion from an actual GNSS signal to a pseudo GNSS signal or from a pseudo GNSS signal to an actual GNSS signal, a client apparatus may receive a GNSS signal without interruption.

Additional aspects will be set forth in part in the description which follows and, in part, will be apparent from the description, or may be learned by practice of the presented embodiments.

According to one or more embodiments, a global navigation satellite system (GNSS) signal output system includes a signal generating apparatus configured to receive GNSS navigation information and generate, based on the GNSS navigation information, a pseudo GNSS signal corresponding to a current time and a current location, a plurality of leakage cables including a plurality of signal leakage slots, and a plurality of signal output apparatuses configured to receive the pseudo GNSS signal from the signal generating apparatus and output the pseudo GNSS signal to at least one of the plurality of leakage cables, wherein the plurality of signal output apparatuses are arranged apart from each other.

Each of the plurality of leakage cables may include a plurality of leakage slots repeatedly arranged at certain intervals in an outer conductor of a coaxial cable.

Two leakage cables running in opposite directions may be connected to each of the plurality of signal output apparatuses.

The signal generating apparatus may be further configured to generate pseudo GNSS signals of a plurality of satellites, wherein the plurality of signal output apparatuses may include a first group signal output apparatus and a second group signal output apparatus, wherein the first group signal output apparatus may be configured to output a pseudo GNSS signal corresponding to first-group satellites among the plurality of satellites, and the second group signal output apparatus may be configured to output a pseudo GNSS signal corresponding to second-group satellites among the plurality of satellites, wherein the signal generating apparatus may be further configured to output a pseudo GNSS signal corresponding to the first-group satellites to the first group signal output apparatus and output a pseudo GNSS signal corresponding to the second-group satellites to the second group signal output apparatus.

The signal generating apparatus may be further configured to generate IQ phase data, based on the GNSS navigation information, and modulate at least one of a carrier signal of a GNSS L1 frequency band or carrier signal of a GNSS L5 frequency band by using the IQ phase data to generate the pseudo GNSS signals.

The signal generating apparatus may be further configured to receive the GNSS navigation information in a first period from a server providing information about a predicted future position of a GNSS satellite for a certain period of time.

The signal generating apparatus may include a first communication module, a memory, a signal transmission module; and a first processor configured to receive the GNSS navigation information for each of a plurality of GNSS satellites from a server through the first communication module, store the received GNSS navigation information in the memory, generate IQ phase data based on the GNSS navigation information, and control the signal transmission module to generate the pseudo GNSS signal by using the IQ phase data and to output the pseudo GNSS signal to the plurality of signal output apparatuses.

The GNSS navigation information may include at least one of pseudo random number (PRN) information of a GNSS signal to be received by the signal generating apparatus, a code frequency, a code phase, a carrier frequency, a carrier phase, a plurality of subframes, a navigation message according to time, a pseudorange in which ionospheric delay is reflected, a pseudorange rate, an azimuth, and an altitude (AZEL), or a combination thereof.

The GNSS navigation information may include receiver independent exchange format (RINEX) information.

The signal generating apparatus may be further configured: to receive a real-time satellite signal, calculate, based on the real-time satellite signal, a frequency shift value of the real-time satellite signal with respect to a default carrier frequency, and generate, based on the GNSS navigation information and the frequency shift value, IQ phase data corresponding to a current time and a current location.

The signal generating apparatus may be further configured to calculate the frequency shift value and a coarse/acquisition (C/A) code phase value by cross-correlating a local signal with the real-time satellite signal, the local signal being generated by reflecting the IQ phase data.

The signal generating apparatus may be further configured to generate the pseudo GNSS signal by reflecting the frequency shift value and the C/A code phase value in the local signal.

The signal generating apparatus and the plurality of signal output apparatuses may be connected to each other by using a coaxial cable, wherein the plurality of signal output apparatuses may be further configured to receive the pseudo GNSS signal through the coaxial cable and output the received pseudo GNSS signal to the leakage cables.

The signal generating apparatus and the plurality of signal output apparatuses may be connected to each other by using an optical cable, wherein the plurality of signal output apparatuses may be further configured to photoelectrically convert the pseudo GNSS signal received through the optical cable and output the converted pseudo GNSS signals to at least one leakage cable connected to each of the plurality of signal output apparatuses.

BRIEF DESCRIPTION OF THE DRAWINGS

The above and other aspects, features, and advantages of certain embodiments will be more apparent from the following description taken in conjunction with the accompanying drawings.

DETAILED DESCRIPTION

Figure 1:
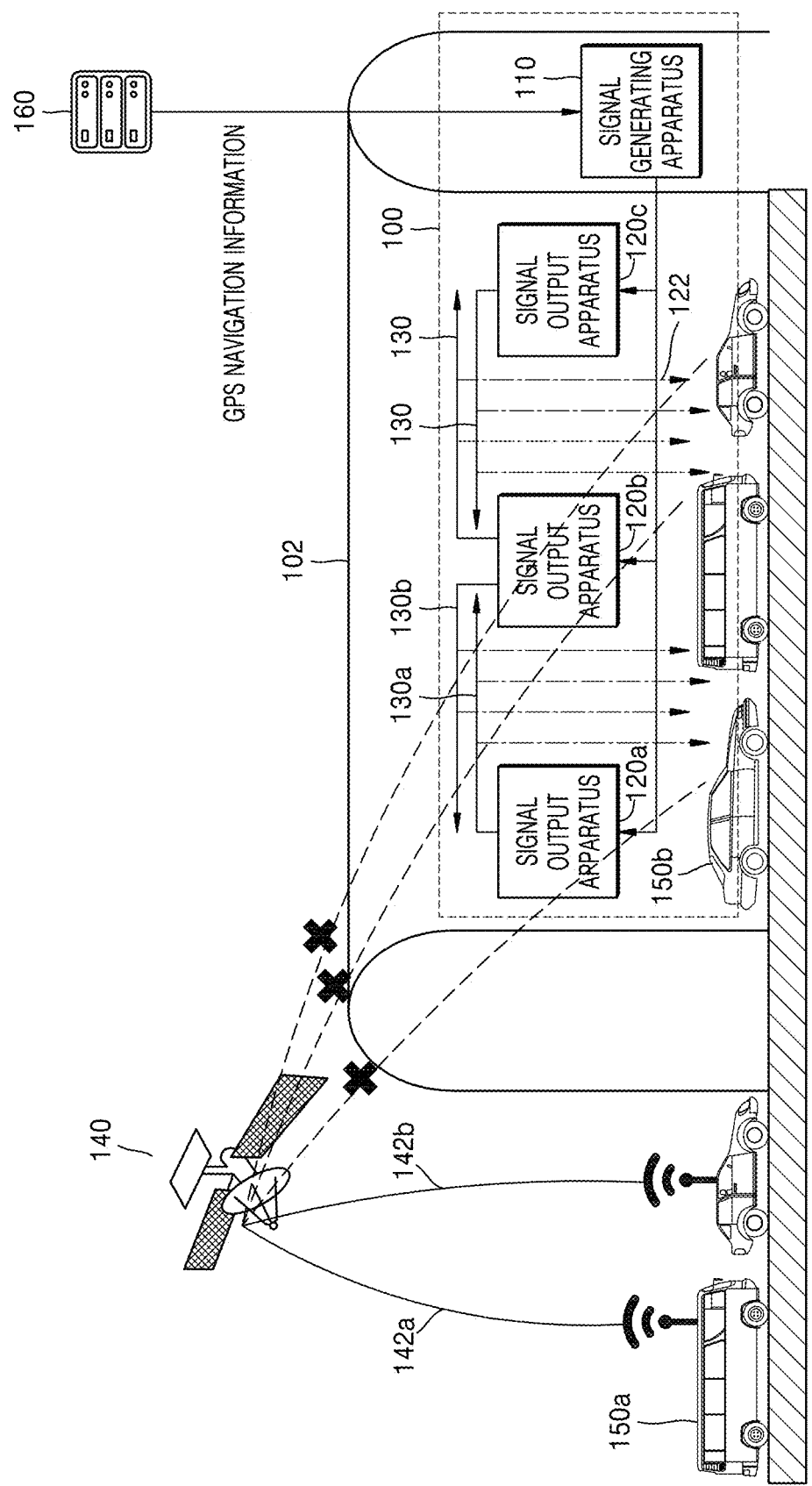
FIG. 1 is a diagram illustrating a global navigation satellite system (GNSS) signal output system according to an embodiment.

Because a GNSS uses information received from a satellite, it is difficult to determine a location of a receiver in a GNSS shaded area where there is a problem with line of sight (LOS) communication with the satellite, such as an underground facility. Accordingly, it is difficult to provide accurate location information when location information is to be provided by using a GNSS in an indoor environment. For example, in the case of a system that provides location information in an indoor environment, an underground facility, or a tunnel such as a navigation guidance system in an underground facility or a bus arrival time notification service, the quality of public services useful to citizens is reduced due to limitations of a GNSS. When a bus is located in an underground transfer center and a long tunnel, because GNSS reception is not possible, it is impossible to track the location of the bus and the accuracy of location information and an estimated arrival time of the bus provided by an estimated arrival time service is reduced.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, principles and embodiments of the disclosure will be described in detail in order to fully convey the scope of the disclosure and enable one of ordinary skill in the art to embody and practice the disclosure. The embodiments may be implemented in various forms.

The same reference numerals denote the same elements throughout the specification. All elements of embodiments are not described in the specification, and descriptions of matters well known in the art to which the disclosure pertains or repeated descriptions between embodiments will not be given. Terms such as "part" and "portion" used herein denote those that may be implemented by software or hardware. According to embodiments, a plurality of parts or portions may be implemented by a single unit or element, or a single part or portion may include a plurality of units or elements. Hereinafter, embodiments of the disclosure and operation principles of the embodiments will be described with reference to the accompanying drawings.

FIG. 1 is a diagram illustrating a global navigation satellite system (GNSS) signal output system 100 according to an embodiment.

The GNSS signal output system 100 according to an embodiment is installed in a GNSS shaded area 102 where satellite signals 142a and 142b are not transmitted from a satellite 140, and generates and outputs a pseudo GNSS signal 122. The GNSS shaded area 102 corresponds to, for example, a tunnel, the inside of a building, or an underground space. The GNSS shaded area 102 is an area where the satellite signals 142a and 142b are not transmitted due to obstacles, such as concrete and steel bars.

Because the satellite signals 142a and 142b are not transmitted into the GNSS shaded area 102, a client apparatus 150b within the GNSS shaded area 102 may not receive a GNSS signal. Due to this, the client apparatus 150b in the GNSS shaded area may not obtain location information through the GNSS signal output system 100. The GNSS signal output system 100 according to embodiments generates a pseudo GNSS signal 122, which is similar to that generated and output by a satellite 140, in the GNSS shaded area 102 and outputs the generated pseudo GNSS signal 122 to the client apparatus 150b within the GNSS shaded area. Because the pseudo GNSS signal 122 is a signal generated identical to a signal output from the satellite 140, the client apparatus 150b may obtain location information by processing the pseudo GNSS signal 122 in the same manner as the satellite signal 142a received outside the GNSS shaded area 102. Accordingly, according to embodiments, location information may be obtained from the pseudo GNSS signal 122 by using general-purpose GNSS modules of client apparatuses 150a and 150b. That is, according to embodiments, the client apparatuses 150a and 150b do not need to change structures thereof to process the pseudo GNSS signal 122.

The GNSS signal output system 100 may be one of, for example, the United states' global positioning system (GPS), Russia's global navigation satellite system (GLONASS), European Union's Galileo, China's BeiDou, Japan's quasi-zenith satellite system (QZSS), and Indian regional navigation satellite system (IRNSS).

According to an embodiment, a server 160 may be a server included in the GNSS signal output system 100 according to an embodiment. The server 160 receives and stores a receiver independent exchange format (RINEX) file during a certain period of time from the satellite 140. Also, the server 160 outputs the RINEX file to a signal generating apparatus 110. The server 160 may be located around a location of the GNSS signal output system 100 (e.g., a tunnel entrance), and may receive the RINEX file from the satellite 140 and may transmit the RINEX file to the signal generating apparatus 110.

According to another embodiment, the server 160 may correspond to an external server, a cloud server, or the like that stores and provides GNSS navigation information of each satellite 140.

The GNSS signal output system 100 according to an embodiment includes a signal generating apparatus 110, signal output apparatuses 120a, 120b, and 120c, and a leakage cable 130.

The signal generating apparatus 110 generates a pseudo GNSS signal 122 and outputs the pseudo GNSS signal 122 to each of the signal output apparatuses 120a, 120b, and 120c. Each of the signal output apparatuses 120a, 120b and 120c is connected to at least one leakage cable 130. Each of the signal output apparatuses 120a, 120b, and 120c outputs the pseudo GNSS signal 122 to a leakage cable 130 connected thereto. The leakage cable 130 is installed in the GNSS shaded area 102 and outputs the pseudo GNSS signal 122.

In the disclosure, an identification number 120 is used to generally refer to the signal output apparatuses 120a, 120b, and 120c, and identification numbers 120a, 120b, and 120c are specifically used to refer to individual signal output apparatuses 120a, 120b, and 120c, respectively. Also, in the disclosure, an identification number 130 is used to generally refer to the leakage cable 130, and identification numbers 130a and 130b are specifically used to refer to individual leakage cables 130a and 130b, respectively.

The signal generating apparatus 110 receives GNSS navigation information from the server 160 and generates a pseudo GNSS signal based on the GNSS navigation information.

The GNSS navigation information is information about a location of at least one satellite 140 at a certain point of time in the future. In the server 160, the GNSS navigation information may be updated at an interval of serval seconds, serval minutes, several days, or several weeks. The signal generating apparatus 110 may receive the GNSS navigation information from the server 160 in a period that is equal to or shorter than an interval at which the GNSS navigation information is updated, to update the stored GNSS navigation information. The signal generating apparatus 110 receives the GNSS navigation information during a certain future time interval (e.g., 4 weeks) of at least one satellite 140 from the server 160. When the number of satellites 140 is 13, the signal generating apparatus 110 receives the GNSS navigation information for each of the 13 satellites 140. According to an embodiment, at least one server 160 that provides the GNSS navigation information corresponding to each of the 13 satellites 140 may exist, and the signal generating apparatus 110 may receive the GNSS navigation information from each of the at least one server 160. The GNSS navigation information may be stored and transmitted, for example, as a RINEX file.

The signal generating apparatus 110 stores and manages the received GNSS navigation information for each satellite. The signal generating apparatus 110 includes a memory and stores GNSS navigation information in the memory.

The signal generating apparatus 110 generates a pseudo GNSS signal 122 by using the GNSS navigation information. The signal generating apparatus 110 generates a pseudo GNSS signal 122 based on the location of the signal generating apparatus 110 and the current time by using the GNSS navigation information. The signal generating apparatus 110 generates a pseudo GNSS signal 122 by modulating at least one of GNSS L1 carrier and GNSS L5 carrier based on the GNSS navigation information. The signal generating apparatus 110 generates IQ phase data corresponding to the current location and current time based on the GNSS navigation information, and modulates the GNSS L1/L5 carriers by using the IQ phase data to generate a pseudo GNSS signals 122. An L1 frequency of an L1 carrier wave is determined to be 1575.42 MHz for a GPS, 1602.0 to 1615.5 MHz for Glonass, 1561.1 MHz for Beidou, 1575.42 MHz for QZSS, and 1176.45 MHz for IRNSS. An L5 carrier wave is determined to be 1176.45 Mhz for GPS, Glonass, Galileo, BeiDou, IRNSS, and QZSS.

The signal generating apparatus 110 may use an analog circuit for generating and processing an analog signal, or a microcontroller and generate a pseudo GNSS signal by using the IQ phase data. The signal generating apparatus 110 may include, for example, a software-defined radio (SDR) device including an RF transceiver, such as a field-programmable gate array (FPGA)-based transceiver (e.g., BladeRF), an ARM core-based transceiver (e.g., HackRF), an Intel core-based transceiver, or an AMD core-based transceiver.

The signal output apparatuses 120a, 120b, and 120c are arranged at certain intervals within the GNSS shaded area 102. The number of signal output apparatuses 120a, 120b, and 120c may vary according to embodiments. The arrangement and number of signal output apparatuses 120a, 120b, and 120c may vary depending on the area, shape, structure, and obstacles of the GNSS shaded area 102.

The signal output apparatuses 120a, 120b, and 120c receive the pseudo GNSS signal 122 from the signal generating apparatus 110. According to an embodiment, the signal generating apparatus 110 converts the pseudo GNSS signal 122 into an optical signal and transmits the pseudo GNSS signal 122 to the signal output apparatuses 120a, 120b, and 120c through an optical cable. The signal output apparatuses 120a, 120b, and 120c photoelectrically convert the GNSS signal 122 received in the form of an optical signal and outputs a signal obtained by the photoelectric conversion to the leakage cable 130.

According to another embodiment, the signal generating apparatus 110 transmits the pseudo GNSS signal 122 to the signal output apparatuses 120a, 120b, and 120c through a coaxial cable. The signal output apparatuses 120a, 120b, and 120c output the pseudo GNSS signal 122 received through the coaxial cable to the leakage cable 130. In the case of using the coaxial cable, the signal output apparatuses 120a, 120b, and 120c may output the received pseudo GNSS signal 122 without a separate signal conversion process or with a certain amplification process.

The leakage cable 130 is installed to transmit signals in a certain direction from the signal output apparatuses 120a, 120b, and 120c. The leakage cable 130 has one end connected to the output terminals of the signal output apparatuses 120a, 120b, and 120c, and the other end connected to a certain signal transmission terminal. The leakage cable 130 is arranged to correspond to a signal propagation direction of the pseudo GNSS signal 122. For example, two leakage cables 130 may be connected to one signal output apparatus 120a, 120b, or 120c, and the two leakage cables 130 may be arranged to transmit pseudo GNSS signals 122 in opposite directions from one signal output apparatus 120a, 120b, or 120c.

The plurality of signal output apparatuses 120a, 120b, and 120c are arranged in the GNSS shaded area 122 at certain intervals. The leakage cable 130 may be arranged parallel to a leakage cable 130 connected to a signal output apparatus 120a, 120b, or 120c adjacent to a signal output apparatus 120a, 120b, or 120c to which a corresponding leakage cable 130 is connected. For example, a first leakage cable 130a connected to a first signal output apparatus, i.e., the signal output apparatus 120a, and a second leakage cable 130b connected to a second signal output apparatus, i.e., the signal output apparatus 120b, may be arranged parallel to each other. In this case, the first leakage cable 130a may be disposed to extend from the signal output apparatus 120a toward the signal output apparatus 120b, and the second leakage cable 130b may be disposed to extend from the signal output apparatus 120b toward the signal output apparatus 120a.

The leakage cable 130 may be referred to as a leakage coaxial cable, and the leakage coaxial cable is a cable in which a slot for signal leakage is formed in an outer conductor of a coaxial cable so that the cable itself functions as an antenna. The leakage cable 130 outputs a pseudo GNSS signal on the principle that a signal leaks around a coaxial cable by flowing electromagnetic waves through the outer conductor of the coaxial cable through artificial processing. The leakage cable 130 may be implemented to optimize signal transmission characteristics in GNSS L1/L5 frequency ranges.

The leakage cable 130 is characterized in that the strength of a signal linearly decreases while the signal is transmitted. Therefore, while the pseudo GNSS signal 122 output from the signal output apparatus 120 is transmitted along the leakage cable 130, the strength of the pseudo GNSS signal 122 linearly decreases. According to an embodiment, the first and second leakage cables 130a and 130b may be arranged side by side to transmit the pseudo GNSS signals 122 in opposite directions, thereby receiving the pseudo GNSS signals 122 having a certain magnitude or more at any location. Therefore, according to an embodiment, there is an effect of maintaining a signal-to-noise ratio (SNR) of a certain level or higher over the entire GNSS shaded area 102 by using the leakage cable 130.

Figure 2:
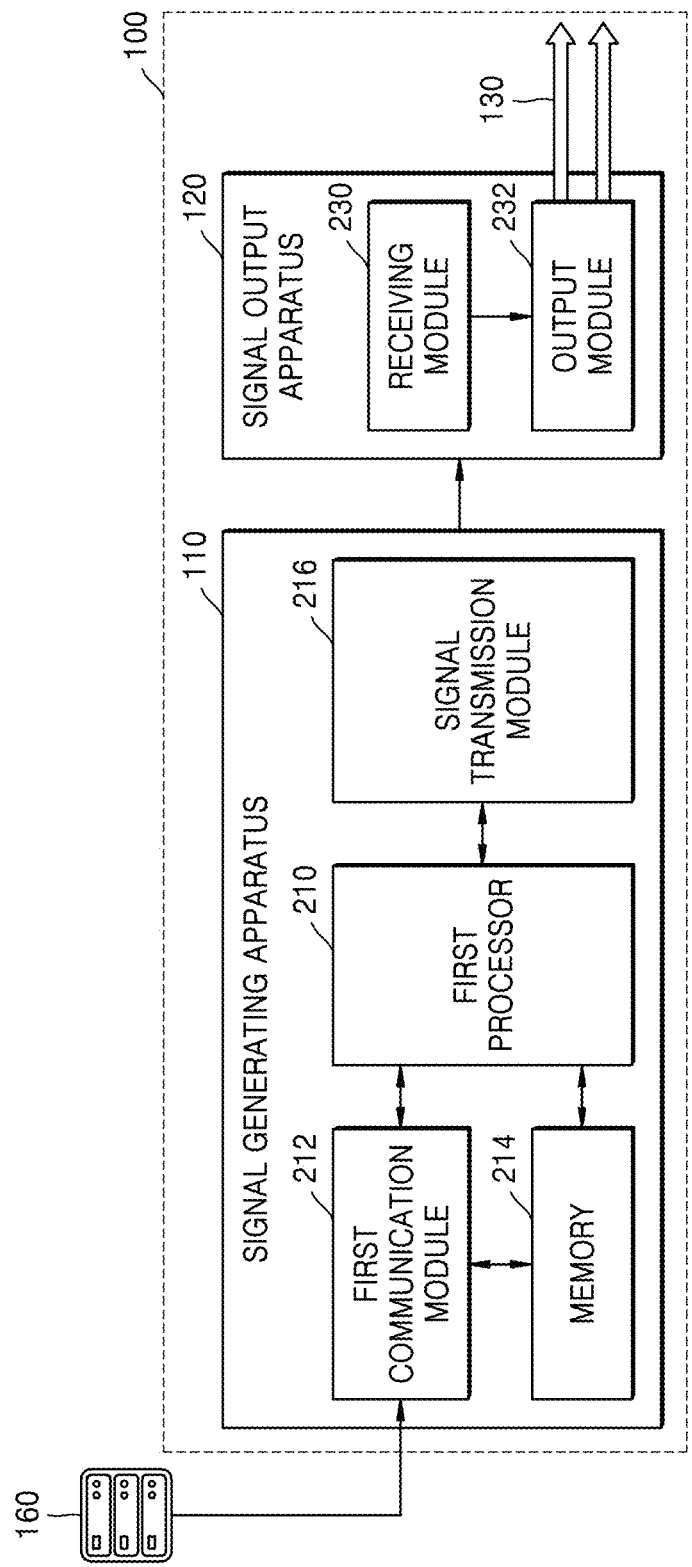
FIG. 2 is a block diagram illustrating structures of a signal generating apparatus and a signal output apparatus, according to an embodiment.

FIG. 2 is a block diagram illustrating structures of a signal generating apparatus 110 and a signal output apparatus 120 according to an embodiment.

According to an embodiment, the signal generating apparatus 110 includes a first processor 210, a first communication module 212, a memory 214, and a signal transmission module 216.

The first processor 210 controls an overall operation of the signal generating apparatus 110. The first processor 210 may be implemented as one or more processors. The first processor 210 may perform a certain operation by executing instructions or commands stored in the memory 214.

The memory 214 may store data and instructions necessary for an operation of the signal generating apparatus 110. The memory 214 may include at least one of a volatile storage medium and a non-volatile storage medium, or a combination thereof. The memory 214 may be implemented as any of various storage media. The memory 214 may include at least one type of storage medium from among a flash memory type, a hard disk type, a multimedia card micro type, a card type memory (e.g., an SD or XD memory), a random-access memory (RAM), a static random-access memory (SRAM), a read-only memory (ROM), an electrically erasable programmable ROM (EEPROM), a programmable ROM (PROM), a magnetic memory, a magnetic disk, and an optical disk. According to an embodiment, the memory 214 may correspond to a cloud storage space. For example, the memory 214 may be implemented through a cloud service.

The memory 214 stores GNSS navigation information received from the server 160.

The first communication module 212 may communicate with an external device by wire or wirelessly. The first communication module 212 communicates with the server 160 and at least one signal output apparatus 120. The first communication module 212 may communicate with the server 160 and the signal output apparatus 120 in different communication methods. The first communication module 212 may perform short-range communication, such as Bluetooth, Bluetooth low energy (BLE), near-field communication, WLAN (Wi-Fi), Zigbee, infrared data association (IrDA), Wi-Fi direct (WFD), ultra-wideband (UWB), or Ant+. In another example, the first communication module 212 may use mobile communication, and may transmit/receive a wireless signal to/from at least one of a base station, an external terminal, and a server in a mobile communication network.

The first processor 210 controls the first communication module 212 to receive the GNSS navigation information from the server 160. The first processor 210 requests the server 160 for the GNSS navigation information and receives the GNSS navigation information in every certain period. The first processor 210 may receive the GNSS navigation information from the server 160 in any of variously defined periods, for example, every week or every month. The processor 210 may access a plurality of servers 160 to receive the GNSS navigation information for the plurality of satellites 140 and may receive the GNSS navigation information. For example, the first processor 210 may receive GNSS navigation information for a first satellite from a first server, and may receive GNSS navigation information for a second satellite from a second server. A time and a period of receiving the GNSS navigation information may vary according to a server. For example, the GNSS navigation information for the first satellite may be received every Monday at 9 a.m. at an interval of one week, and the GNSS navigation information for the second satellite may be received every 1 day at 10 a.m. at an interval of 10 days.

The memory 214 stores server information that provides the GNSS navigation information for each satellite, and information about an update period and an update time. The first processor 210 may obtain, from the server 160, the GNSS navigation information, by using the server information that provides the GNSS navigation information for each satellite and the information about the update period and the update time, which are stored in the memory 214. The server information that provides the GNSS navigation information may include, for example, a server name, a server access address, authentication information for accessing the server, a protocol for communicating with the server, and a server operating entity.

The first processor 210 stores and manages the GNSS navigation information received through the first communication module 212 in the memory 214. The first processor 210 may store and manage, in the memory 214, information such as a last update time of the GNSS navigation information stored in the memory 214, information about how long the GNSS navigation information is retained, a source of the GNSS navigation information, and types and the number of satellites that may currently use the GNSS navigation information from the memory 214. Whenever the GNSS navigation information received from the server 160 is updated, the first processor 210 may store and update GNSS navigation information management information in the memory 214.

The first processor 210 may store and manage, in the memory 214, information about the at least one signal output apparatus 120 and information about an access path. Also, the first processor 210 may receive state information of the at least one signal output apparatus 120 from the at least one signal output apparatus 120, and may manage a state of the at least one signal output apparatus 120. The first processor 210 periodically receives the state information of the at least one signal output apparatus 120, or may receive the state information of the at least one signal output apparatus 120 when an event such as an error occurs in the at least one signal output apparatus 120. The state information of the at least one signal output apparatus 120 may include, for example, a power on/off state of the signal output apparatus 120, and an operation mode (e.g., a normal mode, a GNSS navigation information update mode, or an abnormal mode).

Each of the at least one signal output apparatus 120 may have identification information. The signal generating apparatus 110 may store and manage identification information and location information of the at least one signal output apparatus 120.

The first processor 210 generates IQ phase data by using GNSS navigation information. The IQ phase data is data including information about an amplitude and a phase of an in-phase carrier wave and a quadrature carrier wave used for quadrature amplitude modulation (QAM). The first processor 210 generates IQ phase data corresponding to the current location and current time by using the GNSS navigation information, and outputs the IQ phase data to a signal transmission module 216 that is a signal generation module. The first processor 210 outputs IQ phase data synchronized to the current time to the signal transmission module 216.

The signal transmission module 216 generates a pseudo GNSS signal. The signal transmission module 216 receives the IQ phase data from the first processor 210 and generates a pseudo GNSS signal. The signal transmission module 216 generates a GNSS L1/L5 carrier signal, based on the IQ phase data. An L1 frequency of an L1 carrier wave is determined to be 1575.42 MHz for a GPS, 1602.0 to 1615.5 MHz for GLONASS, 1561.1 MHz for BeiDou, 1575.42 MHz for QZSS, and 1176.45 MHz for IRNSS. An L5 carrier wave determined to be 1176.45 Mhz for GPS, Glonass, Galileo, BeiDou, IRNSS, and QZSS.

The signal transmission module 216 may be implemented as any of various types such as an analog circuit for generating and processing an analog signal, or a microcontroller. The signal transmission module 216 may be implemented as, for example, a software-defined radio (SDR) device including an RF transceiver such as a field-programmable gate array (FPGA)-based transceiver (e.g., BladeRF), an ARM core-based transceiver (e.g., HackRF), an Intel core-based transceiver, or an AMD core-based transceiver. The signal transmission module 216 generates the pseudo GNSS signal and transmits the pseudo GNSS signal to the signal output apparatus 120.

The signal output apparatus 120 includes a receiving module 230 and an output module 232.

The receiving module 230 receives a pseudo GNSS signal from the signal generating apparatus 110. The signal generating apparatus 110 and the signal output apparatus 120 may be connected to each other by using a coaxial cable, an optical cable, or the like. The receiving module 230 receives a pseudo GNSS signal through a coaxial cable or an optical cable. The receiving module 230 performs certain signal processing on the received pseudo GNSS signal. For example, the receiving module 230 may perform processing, such as signal change, signal amplification, and noise removal. The receiving module 230 outputs the received pseudo GNSS signal to the output module 232.

The output module 232 outputs the pseudo GNSS signal received from the receiving module 230 to the leakage cable 130. The output module 232 includes an output terminal and outputs a pseudo GNSS signal to at least one leakage cable 130 connected to the output terminal.

Figure 3:
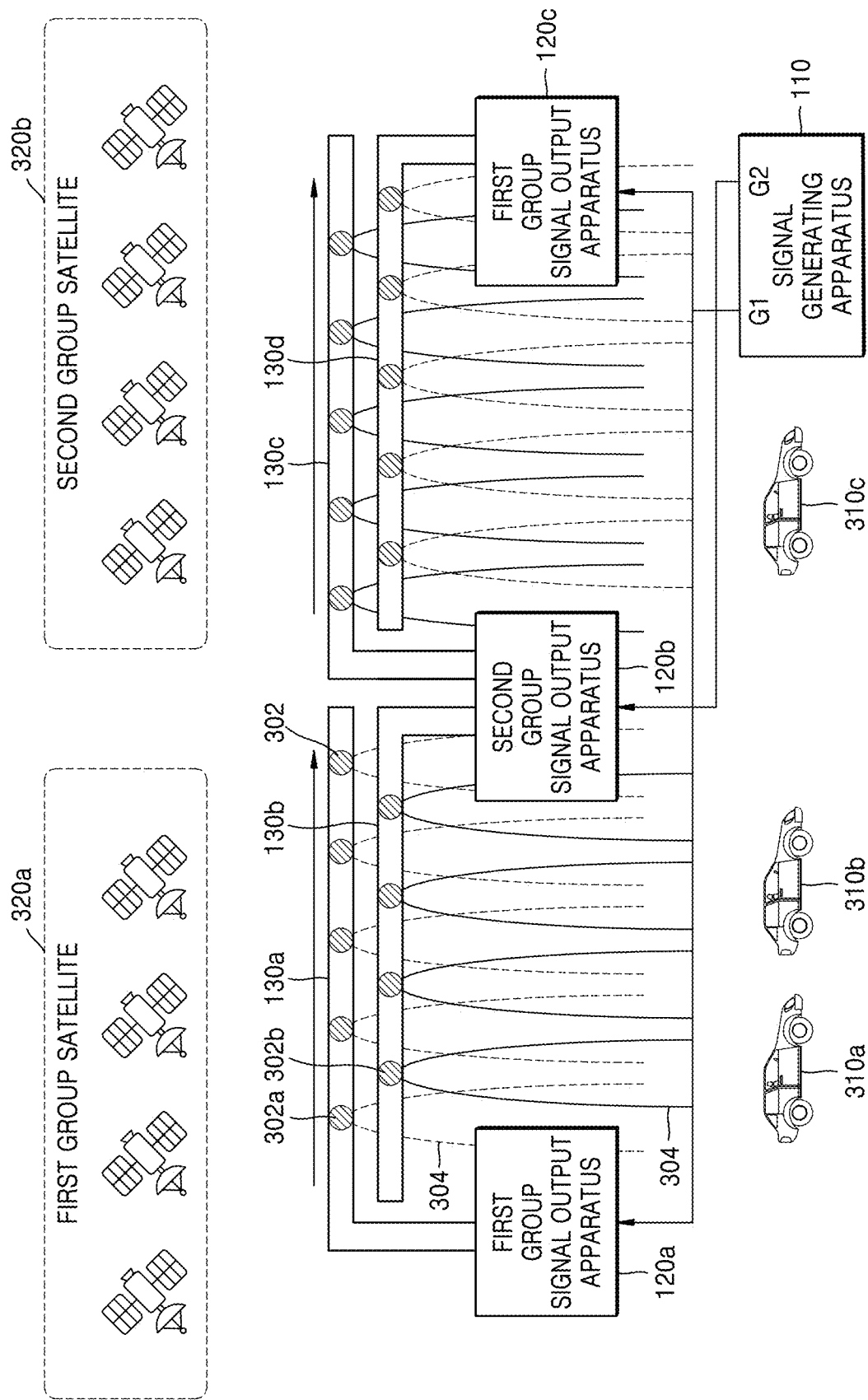
FIG. 3 is a diagram for describing a process of transmitting and outputting a pseudo GNSS signal through a leakage cable, according to an embodiment.

FIG. 3 is a diagram for describing a process of transmitting and outputting a pseudo GNSS signal through a leakage cable, according to an embodiment.

The leakage cable 130 includes a plurality of signal leakage slots 302 formed at regular intervals. The plurality of signal leakage slots 302 output pseudo GNSS signals transmitted through the leakage cable 130. The leakage cable 130 is disposed near a ceiling of a GNSS shaded area. The plurality of signal leakage slots 302 are disposed to face the ground at respective positions. A pseudo GNSS signal output through each of the signal leakage slots 302 travels from the signal leakage slot 302 toward the ground. Accordingly, the pseudo GNSS signal output through the signal leakage slot 302 is output to a radiation area 304 immediately below the signal leakage slot 302. The radiation area 304 corresponds to a limited area from the signal leakage slot 302 of the leakage cable 130 toward the ground. The radiation area 304 is represented by the signal characteristics of the pseudo GNSS signal and the characteristics of the signal leakage slot 302. Because the radiation area 304 appears as a very limited area centered on the signal leakage slot 302, the pseudo GNSS signal linearly decreases in size while being transmitted through the leakage cable 130, and a linearly reduced pseudo GNSS signal is output to the radiation area 304 corresponding to each signal leakage slot 302.

Accordingly, each of first to third client apparatuses 310a, 310b, and 310c receives a pseudo GNSS signal output from the signal leakage slot 302 corresponding to a corresponding location. Accordingly, the first client apparatus 310a receives pseudo GNSS signals output from the first signal leakage slot 302a and the second signal leakage slot 302b. In this case, because a pseudo GNSS signal output from the first signal leakage slot 302a is close to a first group signal output apparatus 120a that is a signal source, the strength of the pseudo GNSS signal output from the first signal leakage slot 302a is relatively strong. However, because a pseudo GNSS signal output from the second signal leakage slot 302b is far from a second group signal output apparatus 120b that is a signal source, the strength of the pseudo GNSS signal output from the second signal leakage slot 302a is relatively weak. In this case, the first client apparatus 310a may obtain a pseudo GNSS signal having an SNR of a certain level or higher by using the pseudo GNSS signal of the first signal leakage slot 302a.

According to an embodiment, the signal output apparatus 120 includes a first group signal output apparatus and a second group signal output apparatus. First group signal output apparatuses 120a and 120c receive a pseudo GNSS signal of a first group satellite 320a. A second group signal output apparatus 120b receives a pseudo GNSS signal of a second group satellite 320b. A plurality of satellites generating pseudo GNSS signals in the signal generating apparatus 110 may be divided into the first group satellite 320a and the second group satellite 320b. The signal generating apparatus 110 outputs the pseudo GNSS signal of the first group satellite 320a to the first group signal output apparatuses 120a and 120c, and outputs the pseudo GNSS signal of the second group satellite 320b to the second group signal output apparatus 120b. The signal generating apparatus 110 includes terminals G1 and G2 for outputting a pseudo GNSS signal. The terminal G1 may be connected to the first group signal output apparatuses 120a and 120c, and the terminal G2 may be connected to the second group signal output apparatus 120b.

The first group signal output apparatuses 120a and 120c and the second group signal output apparatus 120b may be alternately arranged. That is, as shown in FIG. 3, the first group signal output apparatus 120a, the second group signal output apparatus 120b, and the first group signal output apparatus 120c may be arranged in this order. Although only three signal output apparatuses 120 are shown in FIG. 3, more signal output apparatuses 120 may be arranged according to the size of the GNSS shaded area.

The first group signal output apparatus 120a outputs the pseudo GNSS signal of the first group satellite 320a through the first leakage cable 130a. The second group signal output apparatus 120b outputs the pseudo GNSS signal of the second group satellite 320b through the second leakage cable 130b. With this configuration, the first client apparatus 310b may receive pseudo GNSS signals of both the first group satellite 320a and the second group satellite 320b or receive only the pseudo GNSS signal of the first group satellite 320a. However, because the first group satellite 320a includes four or more satellites, the first client apparatus 310a may calculate a location by using only the pseudo GNSS signal of the first group satellite 320a. Therefore, according to an embodiment, by dividing the signal output apparatus 120 into the first group signal output apparatus 120a and the second group signal output apparatus 120b, there is an effect of maintaining the performance of the GNSS signal output system 100 while improving the transmission efficiency of pseudo GNSS signals.

Figure 4:
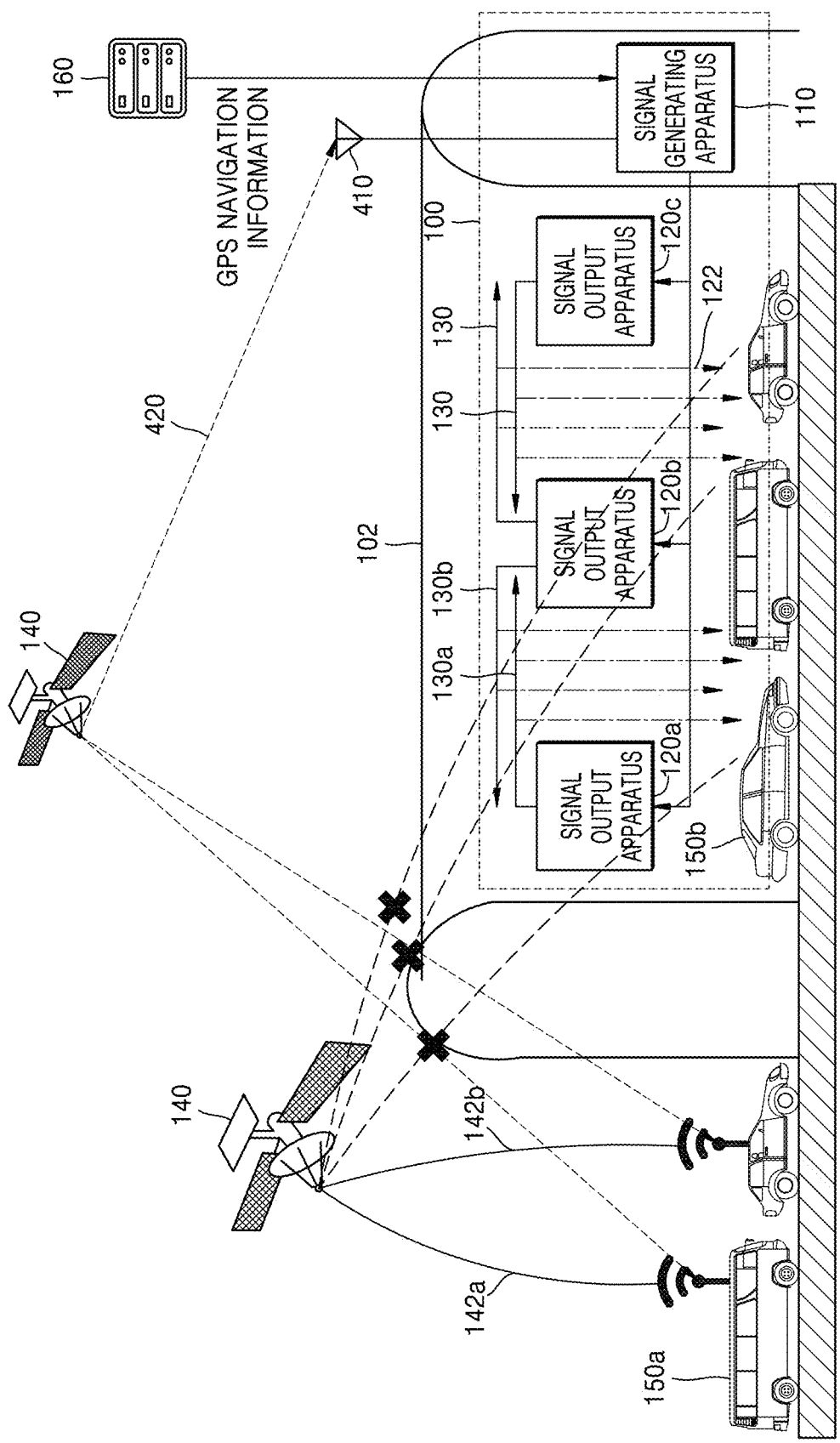
FIG. 4 is a diagram illustrating a GNSS according to an embodiment.

FIG. 4 is a diagram illustrating a GNSS signal output system 100 according to an embodiment.

In order to avoid redundant description, the description will focus on differences from FIG. 1 with reference to FIG. 4.

According to an embodiment, a signal generating apparatus 110 of the GNSS signal output system 100 receives a real-time satellite signal 420 from a satellite 140. The signal generating apparatus 110 measures a frequency shift value of the real-time satellite signal 420 by using the real-time satellite signal 420. Also, the signal generating apparatus 110 receives GNSS navigation information from the server 160. The signal generating apparatus 110 uses the GNSS navigation information and the frequency shift value to generate pseudo GNSS signal information to which the frequency shift value is reflected.

The real-time satellite signal 420 may be referred to as a precision satellite signal. The real-time satellite signal 420 may correspond to, for example, a 1 ns standard PPS-pules per second, 10 MHz REF-reference signal.

The signal generating apparatus 110 receives the real-time satellite signal 420, and calculates a frequency shift value of the real-time satellite signal 420. The frequency shift value is a value caused by a Doppler shift phenomenon according to a motion of the satellite 140. The frequency shift value may vary according to time, and the signal generating apparatus 110 calculates the frequency shift value in real time based on the real-time satellite signal 420. The signal generating apparatus 110 may calculate the frequency shift value through cross-correlation between the real-time satellite signal 420 and a default carrier signal.

Figure 5:
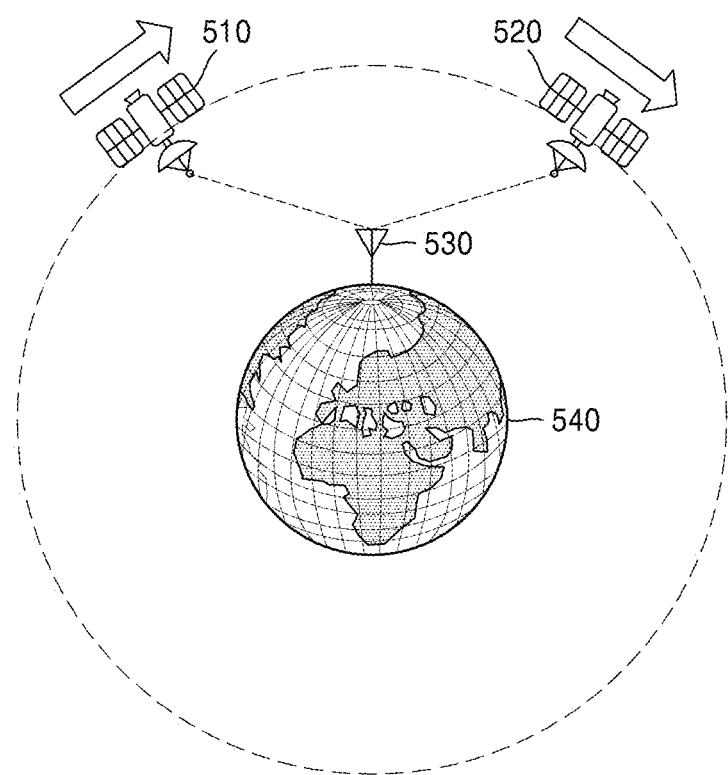
FIG. 5 is a diagram for describing correction of a frequency shift value, according to an embodiment.

FIG. 5 is a diagram for describing correction of a frequency shift value, according to an embodiment.

The GNSS signal output system 100 transmits a GNSS signal in a pre-set frequency band. For example, a GPS system radiates a GPS signal in a frequency band of 1575.42 MHz that is a center (nominal) frequency of the GPS system. However, 24 GPS satellites rapidly rotate around the earth 540, and thus a Doppler shift occurs due to the rotation. For example, it is assumed that an antenna 530 installed at a certain location receives a GPS signal. When a GPS signal is received from a GPS satellite 510 moving closer to the antenna 530, the GPS signal detected by the antenna 530 has a Doppler shift in which a frequency increases from the center frequency of 1575.42 MHz of the GPS signal. In contrast, when a GPS signal is received from a GPS satellite 220 moving farther away from the antenna 530, the GPS signal detected by the antenna 530 has a Doppler shift in which a frequency decreases from the center frequency of 1575.42 MHz of the GPS signal. Such a Doppler shift is about +−10 kHz when a client apparatus receiving a GPS signal moves, and is about +−5 kHz when the client apparatus is stationary.

Due to a frequency change caused by a Doppler shift, a client apparatus locks a frequency to a satellite signal to be communicated, tracks a frequency of a corresponding satellite, and maintains communication with the corresponding satellite. In the case of a precise client apparatus, whether a GNSS signal is an actual GNSS signal or a pseudo GNSS signal is distinguished due to a frequency difference. In this case, when the client apparatus receives an actual GNSS signal and then receives a pseudo GNSS signal converted from the actual GNSS signal, due to a frequency difference caused by a Doppler shift, the client apparatus recognizes that the received GNSS signal is not a continuous signal, and thus continuous reception and signal tracking in the client apparatus are interrupted. Even when a time to first fix (TTFF) for a GNSS signal decreases according to such handover, a user of a general client apparatus experiences continuous positioning interruption. For example, when a Doppler effect is not reflected in a pseudo GNSS signal, a client apparatus is locked to a GNSS satellite, and the pseudo GNSS signal has a carrier frequency different from that of an actual GNSS satellite, thereby losing the GNSS signal in a carrier tracking process.

According to embodiments, however, when a pseudo GNSS signal is generated, a Doppler shift at a corresponding location is reflected in the pseudo GNSS signal. Accordingly, when a client apparatus enters or exits an indoor environment or a shaded area where GNSS reception is difficult, continuity of positioning is provided. Also, according to the GNSS signal output system 100 according to embodiments, because a Doppler shift of a real-time satellite signal is reflected in a pseudo GNSS signal, a client apparatus receives a GNSS signal at continuous frequencies and phases. Accordingly, because the client apparatus is continuously locked to the same satellite (or frequency band of the same satellite) during handover and a TTFF is removed, continuous positioning in indoor and outdoor environments may be performed.

Figure 6:
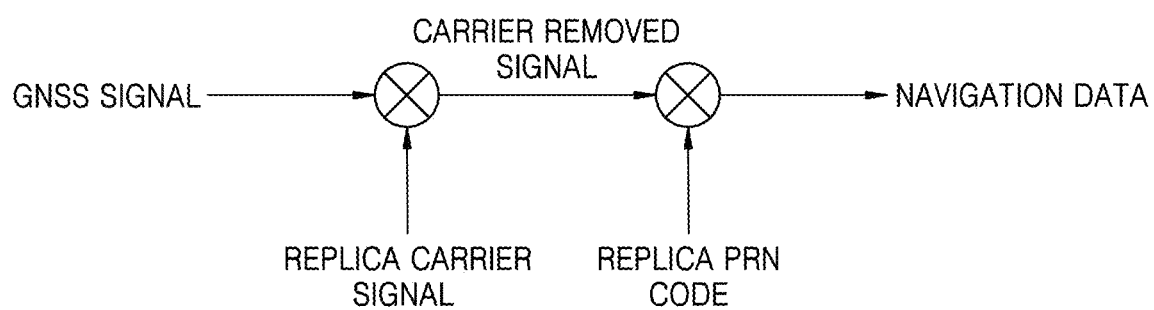
FIG. 6 is a diagram illustrating a configuration in which a client apparatus obtains navigation data from a GNSS signal, according to an embodiment.

FIG. 6 is a diagram illustrating a configuration in which a client apparatus obtains navigation data from a GNSS signal, according to an embodiment.

When a client apparatus receives a GNSS signal, the client apparatus obtains navigation data by removing a carrier wave and a pseudo random number (PRN) code. The PRN code is a value corresponding to a coarse/acquisition (C/A) code, and is also referred to as a C/A PRN code. To this end, the client apparatus converts the input GNSS signal into a baseband by multiplying the GNSS signal by a replica carrier signal. Also, the client apparatus correlates a replica PRN code with a carrier removed signal from which a carrier signal is removed and removes a PRN code from the carrier removed signal. The PRN code is represented as phase information in the GNSS signal. Due to this process, the client apparatus obtains the navigation data from which the carrier signal and the PRN code are moved.

When a client apparatus receives a GNSS signal, the client apparatus undergoes acquisition and tracking, to obtain a carrier frequency and PRN code phase information. Next, the client apparatus extracts navigation data from the GNSS signal, calculates a pseudorange based on the navigation data, and then measures a location through multilateration.

In order to know a carrier frequency and PRN code phase information, a client apparatus obtains and tracks a carrier frequency and PRN code phase of a GNSS signal while receiving the GNSS signal. The client apparatus obtains navigation data by removing the carrier frequency and the PRN code from the GNSS signal by using the carrier frequency and the PRN code phase obtained by the tracking. When the client apparatus moves from a GNSS signal non-shaded area to a shaded area and handover occurs from an actual GNSS signal to a pseudo GNSS signal, or vice versa, the risk of failing to track a carrier frequency and track a PRN code phase increases. According to embodiments, however, when a pseudo GNSS signal is generated, a frequency shift value of a carrier frequency and a change in a PRN code phase due to a Doppler effect are reflected. Accordingly, during handover of the GNSS signal, the risk that a client apparatus fails to track a frequency and track a PRN code phase significantly decreases.

Figure 7:
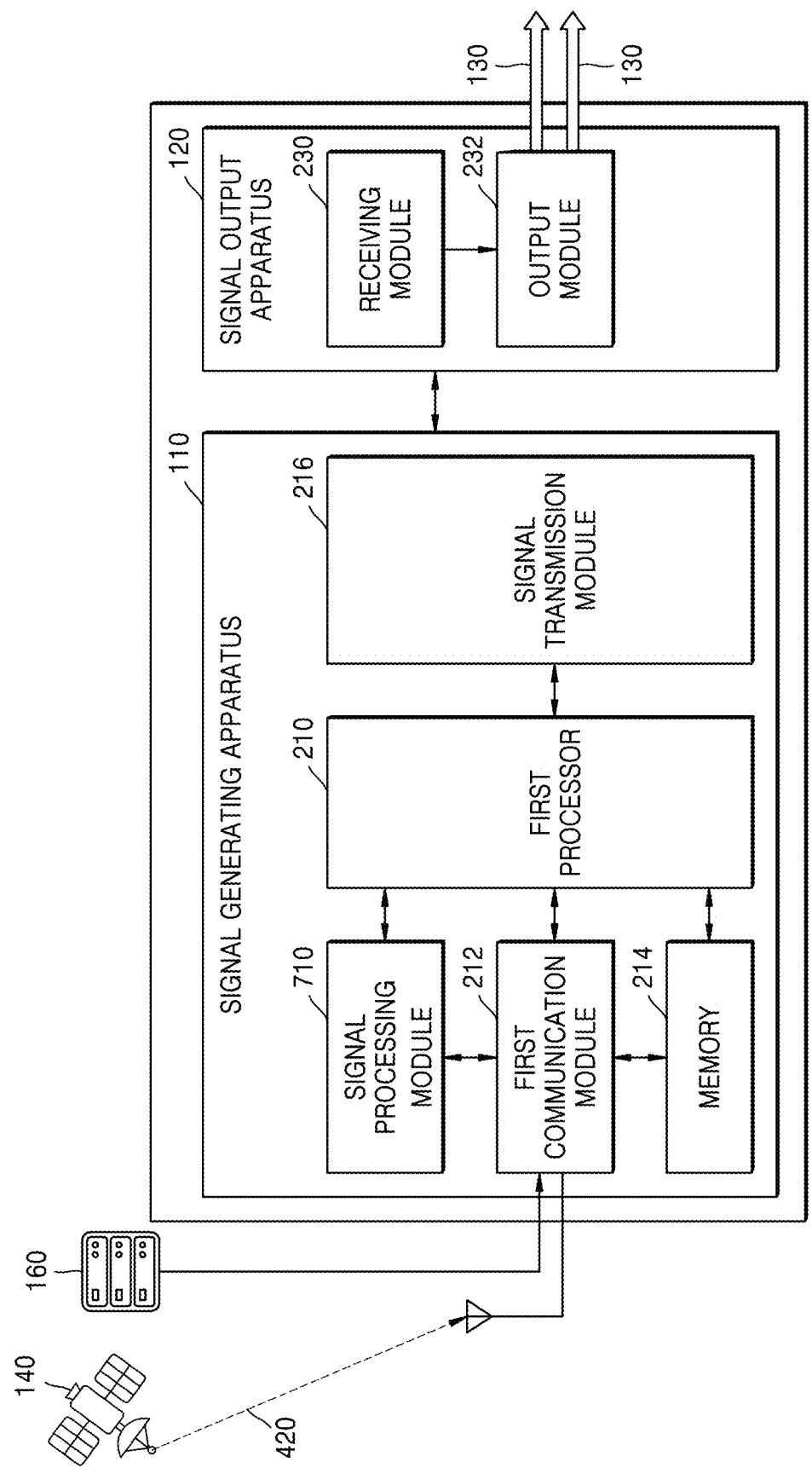
FIG. 7 is a block diagram illustrating structures of a signal generating apparatus and a signal output apparatus, according to an embodiment.

FIG. 7 is a block diagram illustrating structures of a signal generating apparatus 110 and a signal output apparatus 120 according to an embodiment.

In order to avoid redundant description, the description will focus on differences from FIG. 2 with reference to FIG. 7.

The signal generating apparatus 110 includes a signal processing module 710, a first processor 210, a first communication module 212, a memory 214, and a signal transmission module 216.

The first communication module 212 communicates with at least one satellite 140 in a certain signal band. For example, the first communication module 212 may communicate with at least one satellite 140 in an L1/L5 signal band of 1575.42 MHz or 1176.45 MHz. Also, the first communication module 212 may receive a real-time satellite signal 420 from a plurality of satellites 140.

The signal processing module 710 performs analog signal processing on the real-time satellite signal 420 received by the first communication module 212. The signal processing module 710 may perform signal processing to obtain a frequency shift value from the real-time satellite signal 420. The signal processing module 710 may include an analog signal processing circuit that performs certain signal conversion processing, signal amplification processing, or signal multiplying processing.

The first processor 210 calculates a frequency shift value by using a real-time satellite signal 420 received from the satellite 140. The first processor 210 calculates the frequency shift value from the real-time satellite signal 420 by using the signal processing module 710. The first processor 210 may measure a frequency shift value between the real-time satellite signal 420 and a default carrier signal corresponding to a pre-set default carrier frequency. The default carrier frequency is determined according to a type of the GNSS signal output system 100, and is determined to be 1575.42 MHz in the case of a GPS system.

According to an embodiment, the first processor 210 may measure a frequency shift of a real-time satellite signal for a carrier frequency by using software-defined radio (SDR).

According to another embodiment, the signal generating apparatus 110 may obtain a frequency shift value by using the signal processing module 710 including an analog signal processing circuit.

According to an embodiment, the first processor 210 calculates a C/A code phase by using the real-time satellite signal 420 received from the satellite 140. A C/A code that corresponds to a PRN code is a value represented by a phase of the real-time satellite signal 420. The C/A code is a value stored in GNSS navigation information. The first processor 210 may calculate an actual C/A code phase from the real-time satellite signal 420, may calculate a phase difference between received GNSS navigation information and the actual C/A code phase, and may generate a C/A code phase difference value. The first processor 210 defines the calculated C/A code phase difference value as a frequency shift value.

The first processor 210 controls the signal transmission module 216 to generate a pseudo GNSS signal based on the GNSS navigation information and the frequency shift value. The signal transmission module 216 receives the GNSS navigation information and the frequency shift values from the first processor 210. In addition, the signal transmission module 216 modulates a carrier signal having a GNSS L1 frequency and/or a GNSS L5 frequency to generate a pseudo GNSS signal corresponding to the current location and current time.

The first processor 210 adjusts a frequency of a carrier signal by using a frequency shift value. The processor 210 defines the carrier signal by applying the received frequency shift value to a default carrier signal. The first processor 210 generates information about the pseudo GNSS signal based on the defined carrier signal. The information about the pseudo GNSS signal may include at least one parameter value defining properties of the pseudo GNSS signal.

According to an embodiment, the first processor 210 generates IQ phase data for each satellite, based on the information about the pseudo GNSS signal over time. The IQ phase data is data including information about an amplitude and a phase of an in-phase carrier wave and a quadrature carrier wave used for quadrature amplitude modulation (QAM). The first processor 210 generates the IQ phase data and outputs the IQ phase data to the signal transmission module 216. The signal transmission module 216 generates a pseudo GNSS signal for each satellite over time by modulating an analog signal by using the IQ phase data.

The signal generating apparatus 110 outputs the generated pseudo GNSS signal to the signal output apparatus 120. The signal output apparatus 120 outputs the pseudo GNSS signal to a GNSS shaded area through the leakage cable 130.

Figure 8:
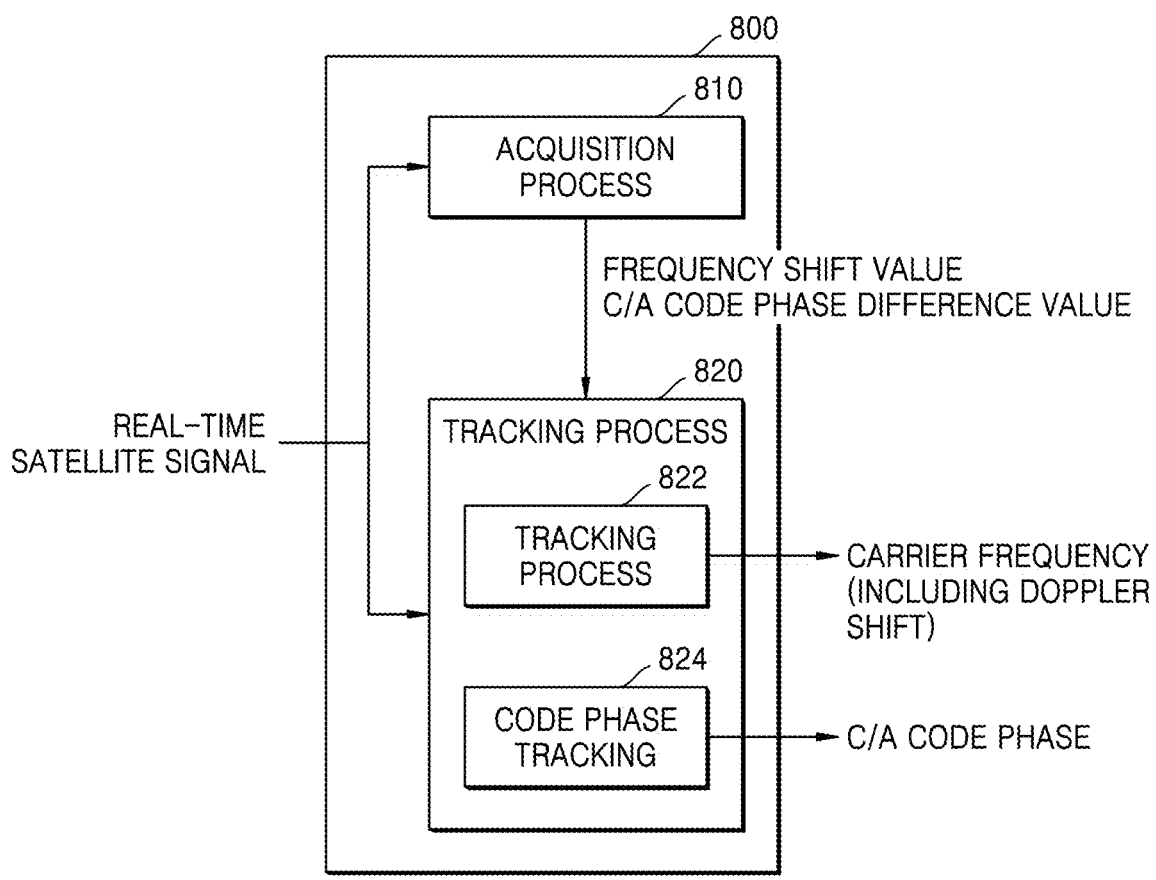
FIG. 8 is a diagram illustrating an operation in which a signal generating apparatus processes a real-time satellite signal, according to an embodiment.

FIG. 8 is a diagram illustrating an operation in which a signal generating apparatus processes a real-time satellite signal, according to an embodiment.

According to an embodiment, the signal generating apparatus 110 receives a real-time satellite signal and performs real-time satellite signal processing 800. The real-time satellite signal processing 800 may be performed by the first processor 210. The first processor 210 performs the real-time satellite signal processing 800, based on computer program instructions stored in the memory 214.

The real-time satellite signal processing 800 includes an acquisition process 810 of detecting a carrier frequency and a C/A code phase from a real-time satellite signal, and a tracking process 820 of tracking the carrier frequency and the C/A code phase. The acquisition process 810 will be described with reference to FIG. 9.

Figure 9:
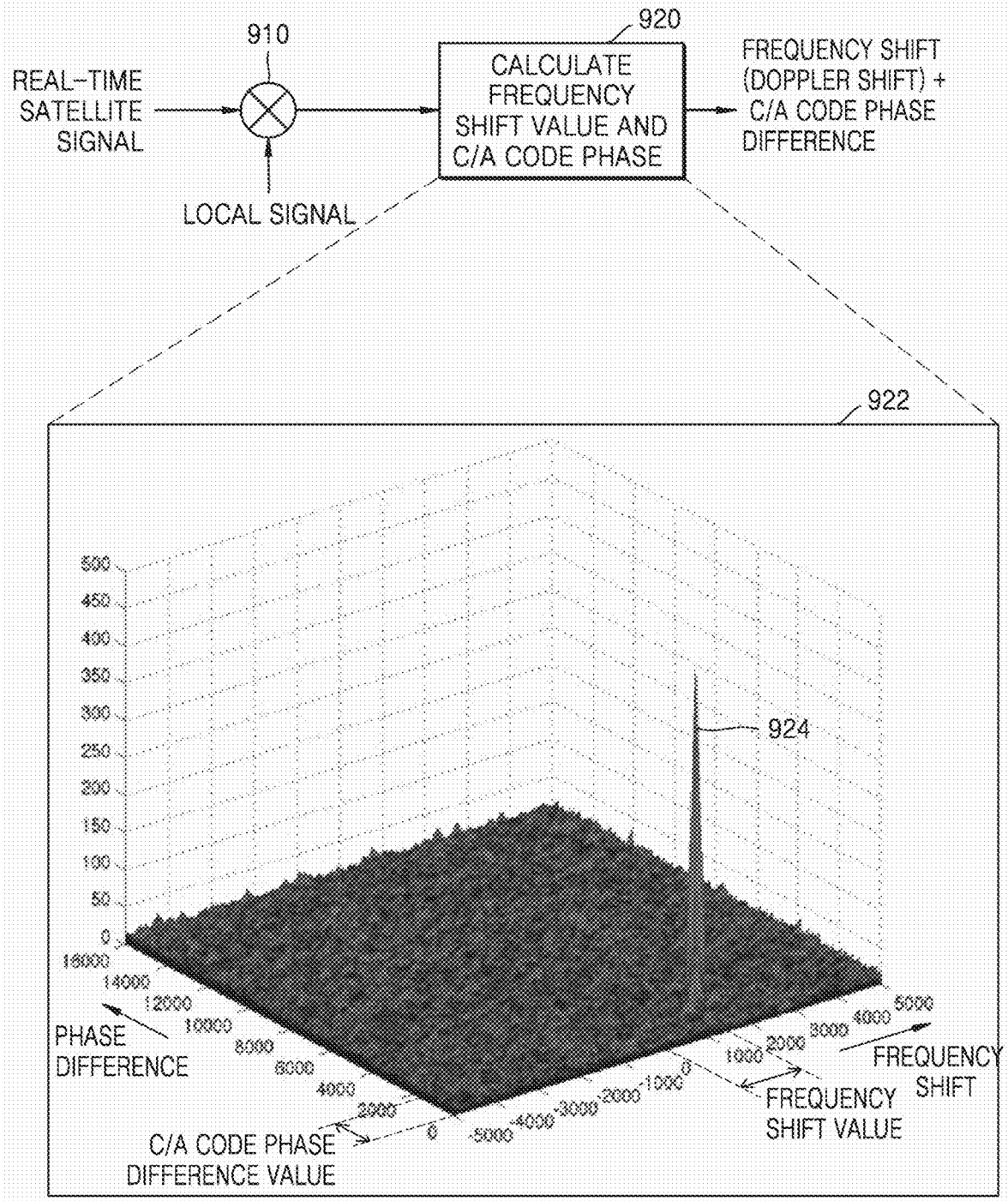
FIG. 9 is a diagram illustrating an acquisition process of a signal generating apparatus, according to an embodiment.

FIG. 9 is a diagram illustrating an acquisition process of a signal generating apparatus, according to an embodiment.

In the acquisition process 810, a C/A code phase and a carrier frequency are calculated. A GNSS satellite signal has a unique carrier frequency and a PRN code. The PRN code corresponds to a C/A code. In the acquisition process 810, a carrier frequency and a C/A code phase are obtained through cross-correlation between a received real-time satellite signal and a locally generated local signal.

The acquisition process 810 includes generating the local signal by using GNSS navigation information. The GNSS navigation information includes C/A code phase information. In the acquisition process 810, a local signal is generated by applying the C/A code phase to a carrier signal of a default carrier frequency.

When the local signal is generated in the acquisition process 810, the real-time satellite signal and the local signal are cross-correlated (Operation 910) to obtain a cross-correlation result value 922. In the acquisition process 810, the cross-correlation is performed on a frequency and a phase.

In the acquisition process 810, a frequency shift value and a C/A code phase difference value are calculated from the cross-correlation result value 922 (Operation 920). In the acquisition process 810, a peak value 924 is determined in the cross-correlation result value 922, and a frequency shift value and a C/A code phase difference value corresponding to the peak value 924 are determined. In the acquisition process 810, the frequency shift value and the C/A code phase difference value corresponding to the peak value 924 are output.

Next, the tracking process 820 will be described with reference to FIG. 8.

When the frequency shift value and the C/A code phase difference value are calculated in the acquisition process 810, in the tracking process 820, a carrier frequency and a C/A code phase tracked based on the calculated frequency shift value and the calculated C/A code phase difference value. In the tracking process 820, carrier tracking 822 and code phase tracking 824 are performed on the carrier frequency and the C/A code phase that are changed by a motion of a satellite, by using a phase lock loop (PLL) method, a frequency lock loop (FLL) method, or a delay lock loop (DLL) method.

According to an embodiment, the acquisition process 810 may be periodically performed, and in the tracking process 820, the carrier tracking 822 and the code phase tracking 824 may be performed based on a result value of the periodic acquisition process 810. According to another embodiment, the acquisition process 810 may be performed to obtain an initial carrier frequency value and C/A code phase value, and thereafter, the acquisition process 810 may be performed only in a pre-defined case, for example, a case where tracking fails in the tracking process 820 or a case where a new type of satellite signal (e.g., a satellite signal transmitted from another satellite) is detected.

The tracking process 820 includes the carrier tracking 822 and the code phase tracking 824. In the carrier tracking 822, a carrier frequency is tracked, based on the frequency shift value obtained in the acquisition process 810. In the carrier tracking 822, carrier frequency tracking is performed by applying the frequency shift value to a default carrier frequency. Accordingly, a carrier frequency value determined in the carrier tracking 822 is a carrier frequency value in which a Doppler shift is reflected. In the code phase tracking 824, a C/A code phase is tracked, based on the C/A code phase difference value obtained in the acquisition process 810. In the code phase tracking 824, code phase tracking is performed by applying the C/A code phase difference value to a C/A code phase of a local signal. Accordingly, a C/A code phase value determined in the code phase tracking 824 is a value in which a C/A code phase of a real-time satellite signal that varies according to a motion of a satellite is reflected.

Figure 10:
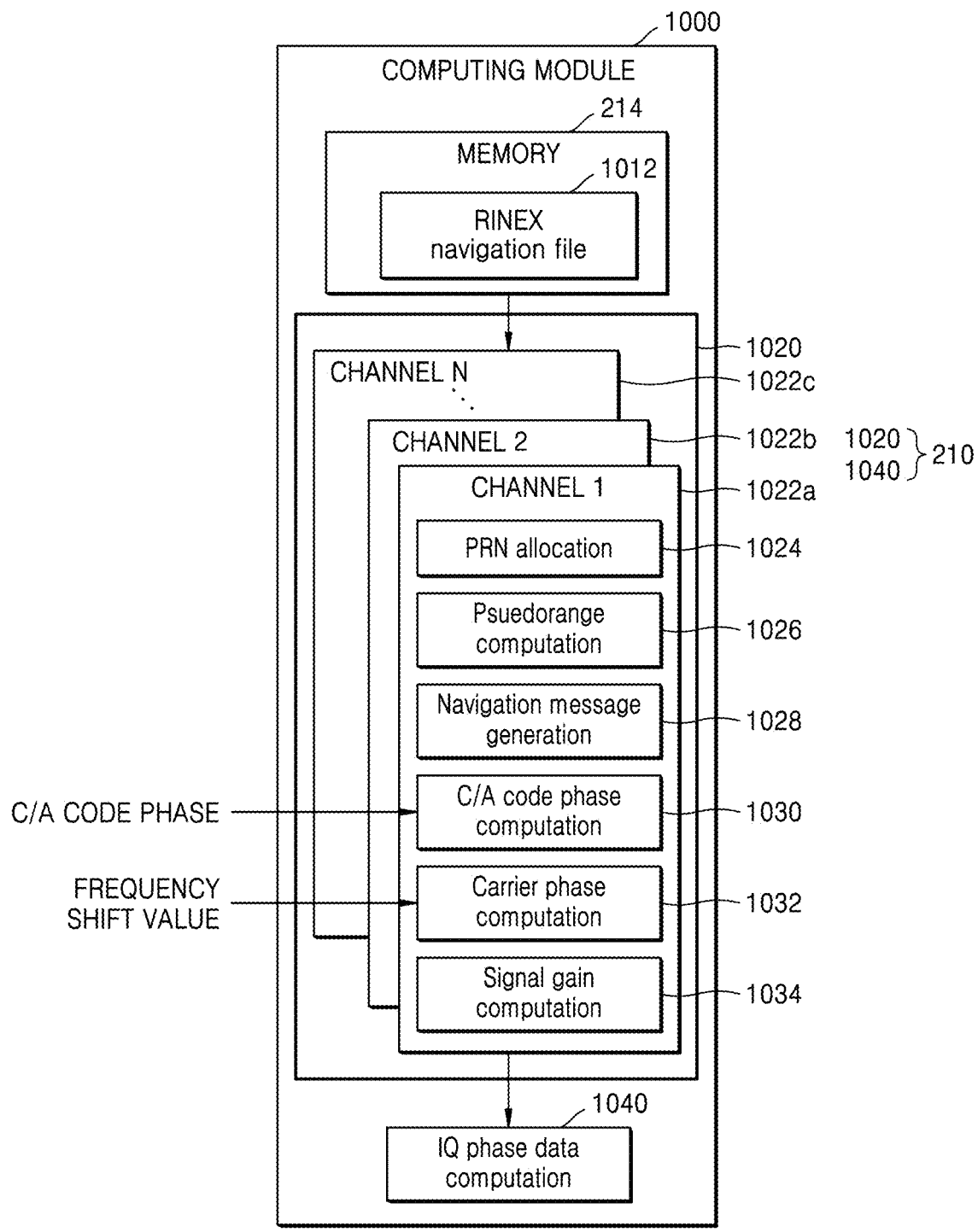
FIG. 10 is a diagram illustrating a structure of a computing module of a signal generating apparatus according to an embodiment.

FIG. 10 is a diagram illustrating a structure of a computing module 1000 of a signal generating apparatus according to an embodiment. The computing module 1000 of FIG. 10 corresponds to the first processor 210 and the memory 214 of FIGS. 2 and 7. According to an embodiment, the computing module 1000 may be implemented as a flexible printed circuit board (FPCB) and may be mounted on the signal generating apparatus 110.

The computing module 1000 includes the memory 214 and the first processor 210. The first processor 210 includes a plurality of channels 1020 and an IQ phase data generator 1040 which generate information about a pseudo GNSS signal for each satellite.

The memory 214 stores a RINEX file corresponding to GNSS navigation information for each satellite. The RINEX file is a data interchangeable format for raw satellite navigation system data. The RINEX file may enable a user to post-process received data to produce a more accurate result. Accordingly, the signal generating apparatus 110 that receives the RINEX file may modify information of the RINEX file according to a current location.

The plurality of channels 1020 read the GNSS navigation information for each satellite stored in the memory 214, and generate information about a pseudo GNSS signal from the GNSS navigation information based on a location of the signal generating apparatus 120. The plurality of channels 1020 include a first channel 1022a, a second channel 1022b, . . . , and an $N^{th}$ channel 1022c corresponding to respective satellites. Each of the first through $N^{th}$ channels 1022a, 1022b, . . . , and 1022c generates the information about the pseudo GNSS signal, by processing the GNSS navigation information corresponding to each satellite.

The GNSS navigation information may include at least one of PRN information of a GNSS signal that may be received by the signal generating apparatus 110, a code frequency, a carrier frequency, a carrier phase, a code phase, a plurality of subframes, a navigation message according to time, a pseudorange in which ionospheric delay is reflected, a pseudorange rate, an azimuth, and an altitude (AZEL), or a combination thereof. According to an embodiment, the GNSS navigation information includes information such as pseudo-random noise (PRN), a coarse/acquisition (C/A) code (or standard code), a precision (P) code, a carrier phase, or a navigation message.

The ionosphere that is a region formed of ionized and electrically charged particles (e.g., ionized gas) is widely located from about 50 km to more than 1,000 km. Because of the electrical properties of the particles, a propagation velocity in the ionosphere is changed. Such an ionospheric error may increase as a time for which a radio wave passes through the ionosphere increases and ionized particles increase. Also, because a time for which a radio wave passes through the ionsphere increases as a satellite is closer to the horizon, and more ionization of particles occurs during the day when the intensity of sunlight is high, a very large ionospheric error occurs for a satellite close to the horizon during the day. Due to such an error, ionospheric delay occurs in a process of transmitting a satellite signal. The GNSS navigation information may include pseudorange information in which the ionospheric delay is reflected, to measure an accurate distance between the signal generating apparatus 110 and the satellite 140.

Each of the first through $N^{th}$ channels 1022a, 1022b, . . . , and 1022c includes a PRN allocation block 1024, a pseudorange calculation block 1026, a navigation message generation block 1028, a C/A code phase calculation block 1030, a carrier phase calculation block 1032, and a signal gain calculation block 1034, in order to process the GNSS navigation information. The PRN allocation block 1024 allocates a PRN based on a current location of the signal generating apparatus 110. The pseudorange calculation block 1026 calculates a pseudorange, based on time delay information included in the GNSS navigation information. The navigation message generation block 1028 generates a navigation message based on a current time and a location. For example, the navigation message includes a plurality of frames, and each frame includes information about a satellite such as satellite orbit information. The C/A code phase calculation block 1030 calculates and outputs a C/A code phase value based on a current location and time of the signal generating apparatus 110. The C/A code phase is updated according to the pseudorange. The carrier phase calculation block 1032 calculates and outputs a carrier phase based on the current location and time of the signal generator 120. The signal gain calculation block 1034 calculates and outputs a signal gain based on an output range of a pseudo GNSS signal. For example, when an output range of a GNSS signal is a radius of 50 m, the signal gain calculation block 1034 calculates and outputs a signal gain for covering the radius of 50 m. The signal gain is calculated through a path error and AZEL information.

The C/A code phase calculation block 1030 determines a C/A code phase by reflecting a C/A code phase difference value. To this end, the C/A code phase calculation block 1032 may adjust a C/A code phase value of pseudo GNSS signal information generated from a RINEX file by using the C/A code phase difference value.

The carrier phase calculation block 1032 determines a carrier frequency and a carrier phase by reflecting a frequency shift value. To this end, the carrier phase calculation block 1032 may adjust a carrier frequency of the GNSS signal information generated from the RINEX file by using the frequency shift value.

The IQ phase data generator 740 generates IQ phase data by synthesizing a signal gain value with a C/A code value of each channel, based on the pseudo GNSS signal information. The generated IQ phase data is stored in the memory 214 or a separate buffer. The first processor 210 streams the stored IQ phase data to the signal transmission module 216 over time.

Information about a pseudo GNSS signal generated by each of the first through $N^{th}$ channels 1022a, 1022b, . . . , and 1022c is output to the IQ phase data generator 1040. The IQ phase data generator 1040 outputs IQ phase data corresponding to each satellite.

The plurality of channels 1020 and the IQ phase data generator 740 may correspond to a software block for executing a certain signal generation algorithm.

Figure 11:
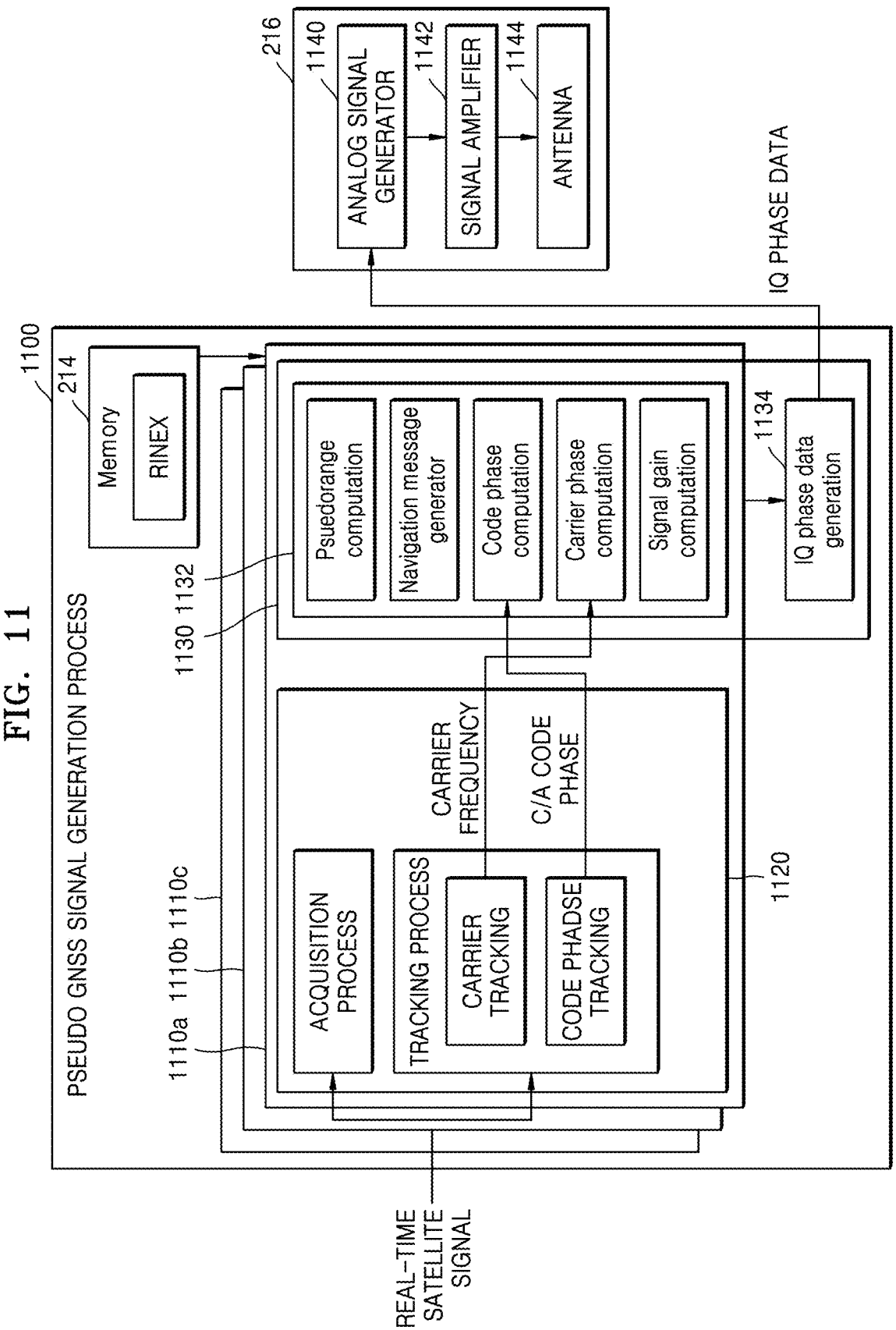
FIG. 11 is a diagram illustrating a process of generating a pseudo GNSS signal, according to an embodiment.

FIG. 11 is a diagram illustrating a process of generating a pseudo GNSS signal, according to an embodiment.

According to an embodiment, the signal generating apparatus 110 may receive satellite signals from a plurality of satellites, and may generate pseudo GNSS signals corresponding to the plurality of satellites. The signal generating apparatus 110 performs real-time satellite signal processing and pseudo GNSS signal generation on each of the plurality of satellites through signal processing channels 1110a, 1110b, and 1110c respectively corresponding to the plurality of satellites. Signal processing processes of the signal processing channels 1110a, 1110b, and 1110c may be performed in parallel.

Pseudo GNSS signal generation 1100 includes real-time satellite signal processing 1120 and IQ signal generation 1130. Each of the signal processing channels 1110a, 1110b, and 1110c performs the real-time satellite signal processing 1120 and the IQ signal generation 1130 on a satellite corresponding to the corresponding channel. The IQ signal generation 1130 includes pseudo GNSS signal information generation 1132 and IQ phase data generation 1134, as described above. In the pseudo GNSS signal information generation 1132, information about a pseudo GNSS signal is generated from GNSS navigation data stored in a RINEX file and is output. In the IQ phase data generation 1134, IQ phase data is generated from the information about the pseudo GNSS signal.

According to an embodiment, the real-time satellite signal processing 1120 and the pseudo GNSS signal information generation 1132 may be performed in parallel for each of the channels 1110a, 1110b, and 1110c for each satellite, and the IQ signal generation 1130 may be performed in series for each satellite. Also, the IQ phase data generated by the IQ signal generation 1130 is output to the signal transmission module 216, and the signal transmission module 216 generates and radiates a pseudo GNSS signal from the IQ phase data.

According to an embodiment, the signal transmission module 216 may sequentially generate and transmit pseudo GNSS signals for the satellites. For example, the signal transmission module 216 may time-divide a signal frame, and may generate and radiate a pseudo GNSS signal for each satellite in each time division zone.

According to another embodiment, the signal transmission module 216 includes a plurality of signal generation channels, and may generate and radiate in parallel pseudo GNSS signals for a plurality of satellites. When pseudo GNSS signals for a plurality of satellites are generated and radiated in parallel, the signal transmission module 216 may include an analog signal generator 1140, a signal amplifier 1142, and an antenna 1144, which correspond to each channel.

According to an embodiment, when the signal transmission module 216 includes a plurality of signal generation channels, the signal transmission module 216 may include three signal generation channels, and may generate and radiate pseudo GNSS signals corresponding to three satellites from IQ phase data for the three satellites. In this case, the pseudo GNSS signal generation 1100 may also include three signal processing channels 1110a, 1110b, and 1110c, and may generate IQ phase data for three satellites and may output the IQ phase data to the signal transmission module 216.

Figure 12:
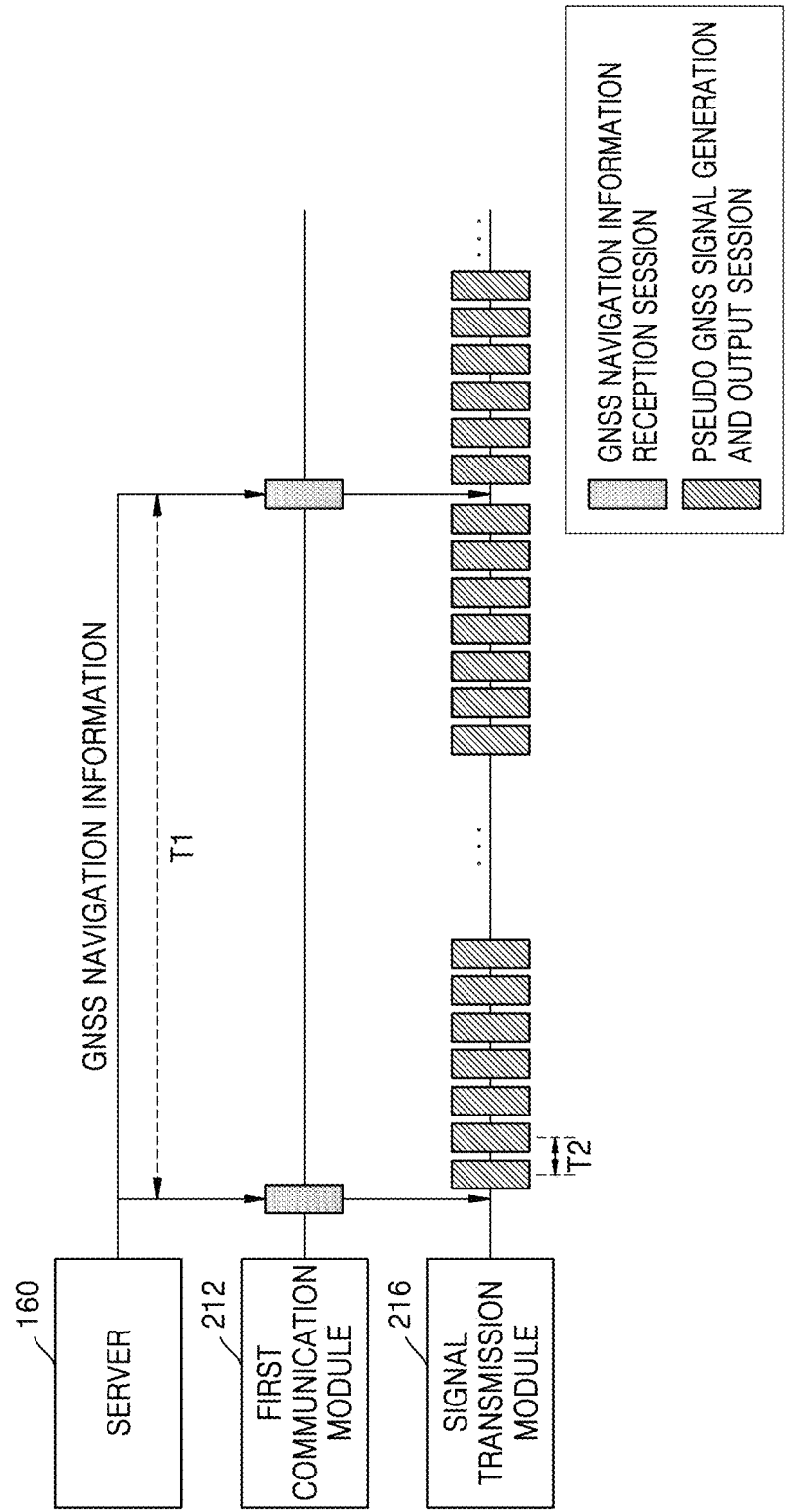
FIG. 12 is a diagram illustrating a process in which a signal generating apparatus generates a pseudo GNSS signal, according to an embodiment.

FIG. 12 is a diagram illustrating a process in which a signal generating apparatus generates a pseudo GNSS signal, according to an embodiment.

According to an embodiment, the signal generating apparatus 110 receives GNSS navigation information from the server 160 in a first period T1. The signal generating apparatus 110 communicates with the server 160 in a GNSS navigation information reception session to receive the GNSS navigation information.

The first communication module 212 receives GNSS navigation information from the server 160 in the first period T1.

The signal transmission module 216 generates and outputs pseudo GNSS signal information in a pseudo GNSS signal generation and output session. The signal transmission module 216 generates and outputs the pseudo GNSS signal information in a second period T2. The second period T2 is a time less than 1 second, and the signal transmission module 216 generates and outputs a pseudo GNSS signal in real time. The second period T2 is a time interval shorter than the first period T1. For example, the second period T2 may be ⅟60 seconds, and the first period T1 may be a week.

The signal generating apparatus 110 receives a real-time satellite signal, separate from the GNSS navigation information, and calculates a frequency shift value and a C/A code phase difference value. A period in which the signal generating apparatus 110 generates and transmits the frequency shift value and the C/A code phase difference value is shorter than the first period T1. Also, a period in which the signal generating apparatus 110 generates and transmits the frequency shift value and the C/A code phase difference value may be equal to or shorter than the second period T2.

Figure 13:
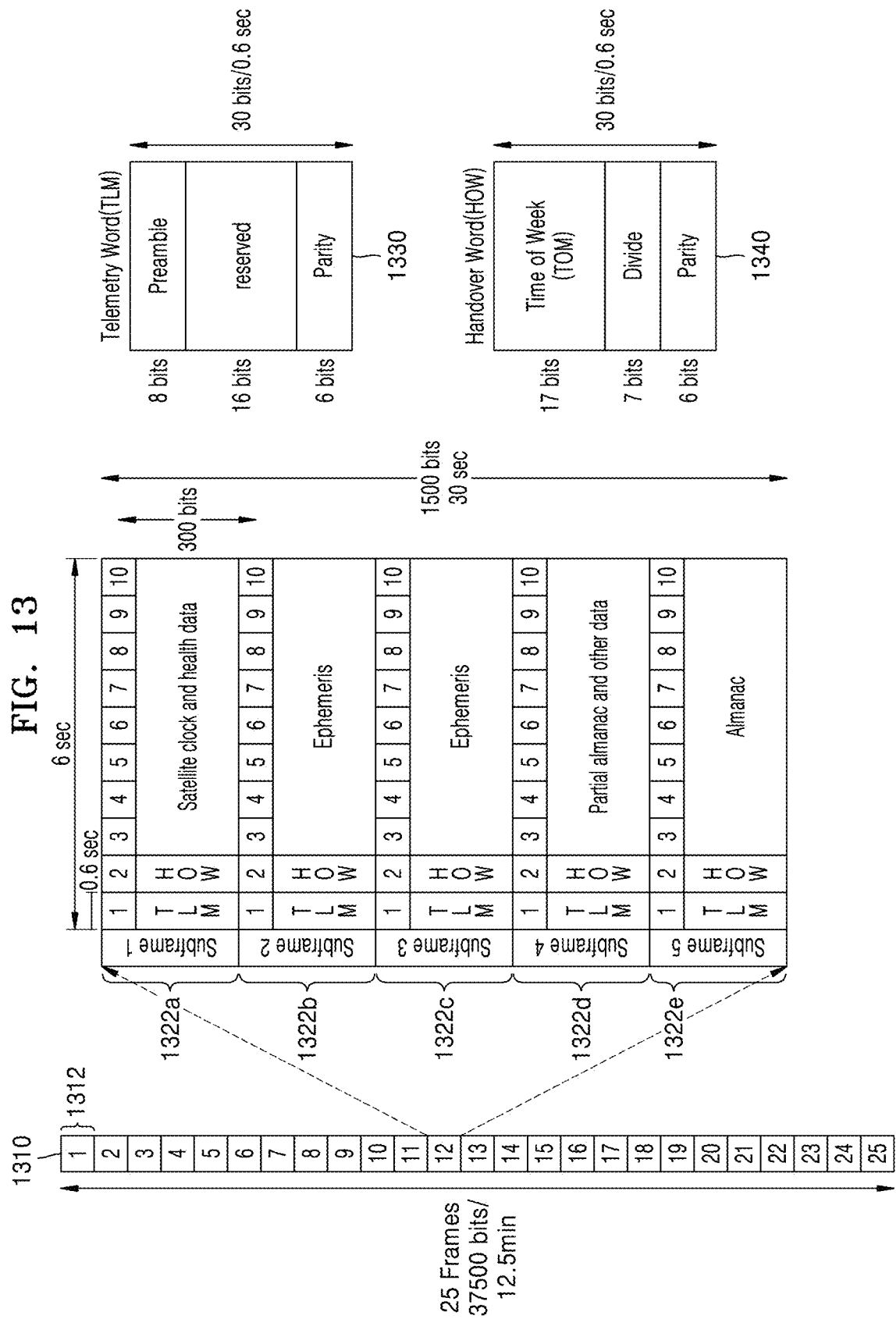
FIG. 13 is a diagram illustrating a structure of a coarse/acquisition (C/A) code signal, according to an embodiment.

FIG. 13 is a diagram illustrating a structure of a C/A code signal, according to an embodiment.

All satellites radiate L1 C/A signals. An L1 signal uses a frequency of 1575.42 MHz. A C/A signal includes a plurality of frames 1310. Each frame 1312 of the plurality of frames 1310 corresponds to one satellite. Each frame 1312 includes a plurality of subframes, e.g., first through fifth subframes 1322a, 1322b, 1322c, 1322d, and 1322e. The first through fifth subframes 1322a, 1322b, 1322c, 1322d, and 1322e store certain allocated information. For example, the first subframe 1322a includes a satellite clock and health data, the second subframe 1322b and the third subframe 1322c include satellite orbit information and ephemeris, the fourth subframe 1322d includes some of satellite orbit information and state information (almanac) and other data, and the fifth subframe 1322e includes satellite orbit information and state information (almanac). Also, each of the first through fifth subframes 1322a, 1322b, 1322c, 1322d, and 1322e includes a telemetry word (TLM) 1330 and a handover word (HOW) 1340. The TLM 1330 that is a remote measurement signal enables a receiver to search for a start point of each subframe and determine a start time of a navigation subframe as a receiver time. The HOW 1340 may be used to give a GNSS time (actually a time when a first bit of a next subframe will be transmitted) and identify a specific subframe within a complete frame.

Figure 14:
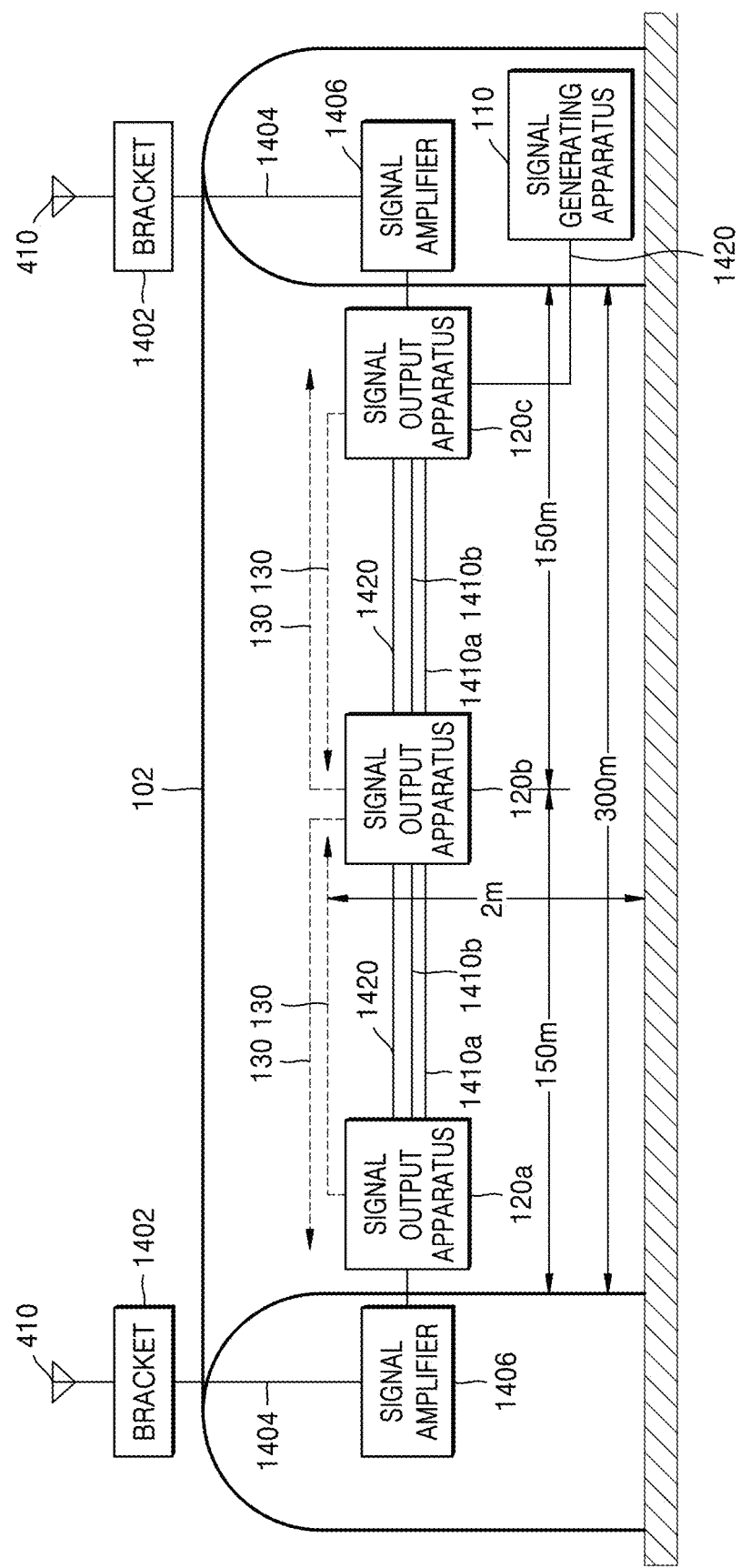
FIG. 14 is a diagram illustrating a GNSS signal output system according to an embodiment.

FIG. 14 is a diagram illustrating a GNSS according to an embodiment.

According to an embodiment, a signal generating apparatus 110 transmits a pseudo GNSS signal to a signal output apparatus 120 through a coaxial cable 1420.

The GNSS signal output system 100 includes an antenna 410 installed outside a GNSS shaded area 102. The antenna 410 may be installed in at least one location around the GNSS shaded area 102. The antenna 410 may be installed around the GNSS shaded area 102 by using a structure, such as a bracket 1402.

According to an embodiment, the antenna 410 is connected to signal output apparatuses 120a and 120c. The signal output apparatuses 120a and 120c obtain a real-time satellite signal received from the antenna 410. The signal output apparatuses 120a and 120c transmit the obtained real-time satellite signal to the signal generating apparatus 110. The signal generating apparatus 110 calculates a frequency shift value of a GNSS signal by using the real-time satellite signal and generates a pseudo GNSS signal reflecting the frequency shift value.

According to an embodiment, when a real-time satellite signal is transmitted from the antenna 410 to the signal output apparatuses 120a and 120c, the real-time satellite signal may be amplified using a signal amplifier 1406. The signal amplifier 1406 is installed between the antenna 410 and the signal output apparatuses 120a and 120c. The real-time satellite signal obtained from the antenna 410 is input to the signal amplifier 1406. The signal amplifier 1406 outputs an amplified real-time satellite signal to the signal output apparatuses 120a and 120c.

The antenna 410, the signal amplifier 1406, and the signal output apparatuses 120a and 120c are connected to each other by a coaxial cable 1404. For example, the coaxial cable 1404 may correspond to a cable with specifications suitable for low power radio frequency (RF) connections.

The antenna 410 may be placed around an open area leading out from the GNSS shaded area 102. One or more antennas 410 may be installed. In addition, the antenna 410 may be connected to a plurality of signal output apparatuses 120a and 120c disposed closest to the antenna 410 from among the plurality of signal output apparatuses 120a, 120b, and 120c. The real-time satellite signal received by the antenna 410 is input to the signal output apparatuses 120a and 120c. The real-time satellite signal input to the signal output apparatuses 120a and 120c is transmitted to the signal generating apparatus 110 through the coaxial cable 1420.

The plurality of signal output apparatuses 120a, 120b, and 120c are connected to a power source through coaxial cables 1410a and 1410b and supplied with power from the power source. The coaxial cables 1410a and 1410b may include, for example, PPS cables.

The plurality of signal output apparatuses 120a, 120b, and 120c may be arranged at intervals at which a pseudo GNSS signal may be transmitted through the leakage cable 130. For example, when a pseudo GNSS signal may be transmitted up to 150 meters through the leakage cable 130 at a reference SNR level or higher, the plurality of signal output apparatuses 120a, 120b, and 120c may be arranged at intervals of 150 meters. For example, when the GNSS shaded area 102 in which the GNSS 102 is installed is a tunnel and the length of the tunnel is 300 meters, the plurality of signal output apparatuses 120a, 120b, and 120c may be arranged at intervals of 150 meters in the tunnel.

Figure 15:
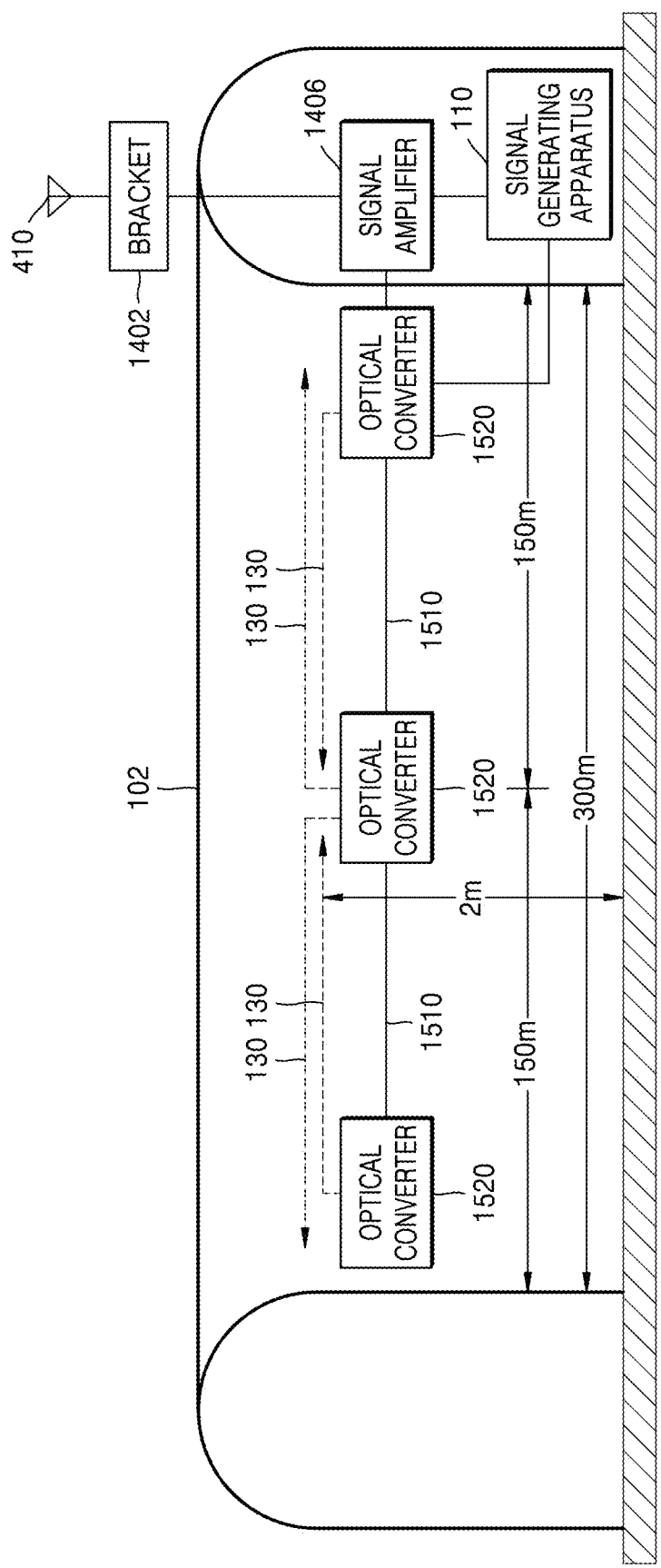
FIG. 15 is a diagram illustrating a GNSS signal output system according to an embodiment.

FIG. 15 is a diagram illustrating a GNSS according to an embodiment.

According to an embodiment, the GNSS signal output system 100 transmits a pseudo GNSS signal through an optical cable 1510.

A signal generating apparatus 110 generates a pseudo GNSS signal and then converts the pseudo GNSS signal into an optical signal. The signal generating apparatus 110 transmits the pseudo GNSS signal converted into an optical signal to a plurality of optical converters 1520 through the optical cable 1510.

The optical converters 1520 corresponds to the signal output apparatus 120. Each of the optical converters 1520 photoelectrically converts the received optical signal to generate an RF signal corresponding to the pseudo GNSS signal. Each of the optical converters 1520 is connected to at least one leakage cable 130. Each of the optical converters 1520 outputs the pseudo GNSS signal converted into an RF signal to the leakage cable 130.

Figure 16:
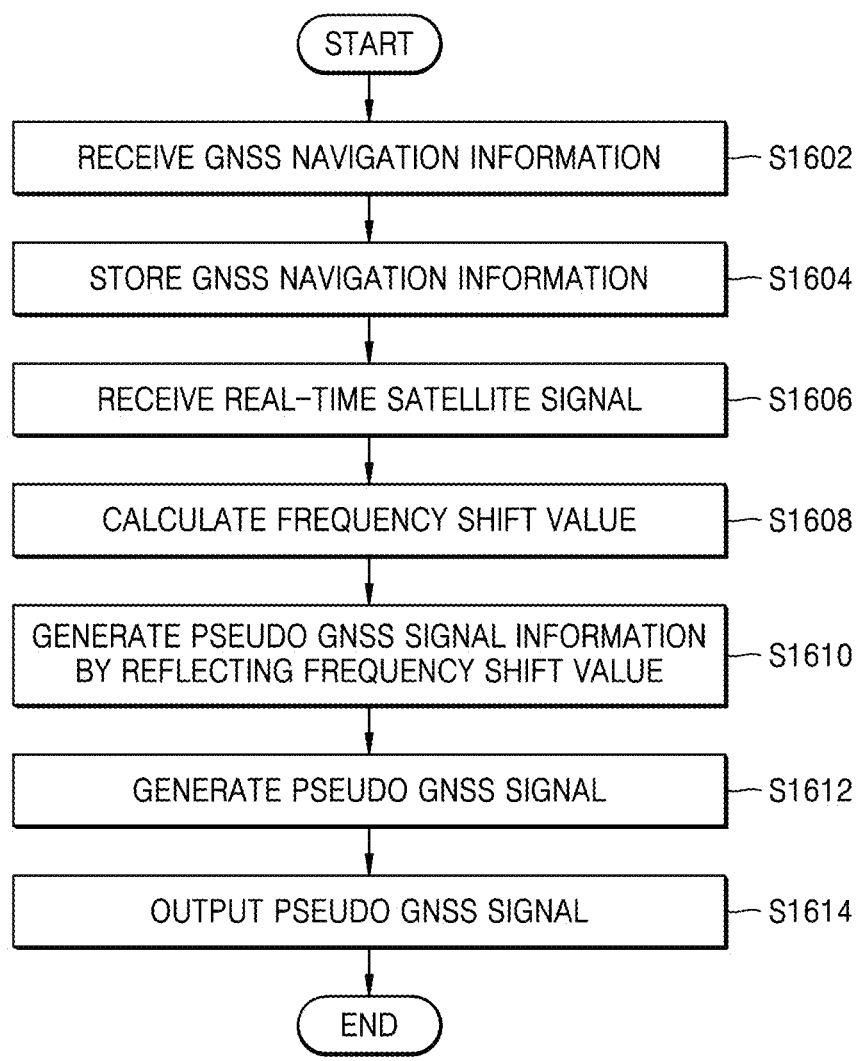
FIG. 16 is a flowchart according to an embodiment.

FIG. 16 is a flowchart according to an embodiment.

A method of generating a GNSS signal according to an embodiment may be performed by various GNSSs. An example in which the GNSS signal output system 100 described with reference to FIGS. 1 through 15 performs a method of generating a GNSS signal will be mainly described. Accordingly, embodiments described for the GNSS signal output system 100 may be applied to embodiments for the method of generating a GNSS signal, and embodiments described for the method of generating a GNSS signal may be applied to embodiments for the GNSS signal output system 100. The method of generating a GNSS signal according to disclosed embodiments is not limited to the embodiment in which the GNSS signal output system 100 performs the method of generating a GNSS signal, and may be performed by various types of GNSSs.

An apparatus for generating a GNSS signal receives GNSS navigation information from a satellite (S1602). The signal generating apparatus 110 receives the GNSS navigation information from a server that provides the GNSS navigation information for each satellite in a certain period.

The signal generating apparatus 110 stores the received GNSS navigation information in a memory (S1604). The signal generating apparatus 110 generates a pseudo GNSS signal by using the stored GNSS navigation information (S1606). The signal generating apparatus 110 generates information about the pseudo GNSS signal at each point of time of each satellite from the GNSS navigation information, and generates IQ phase data based on the information about the pseudo GNSS signal. The signal generating apparatus 110 generates a pseudo GNSS signal by using the IQ phase data.

Also, the signal generating apparatus 110 receives a real-time satellite signal (S1606). The signal generating apparatus 110 installs an antenna in an outdoor environment where a satellite signal is receivable and receives a real-time satellite signal. The signal generating apparatus 110 may receive real-time satellite signals from a plurality of satellites.

The signal generating apparatus 110 calculates and obtains a frequency shift value from the real-time satellite signal (S1608). Also, according to an embodiment, the signal generating apparatus 110 calculates and obtains a C/A code phase value along with the frequency shift value from the real-time satellite signal. The signal generating apparatus 110 may generate a local signal by using the received GNSS navigation information, and may calculate the frequency shift value and the C/A code phase value by cross-correlating the local signal with the real-time satellite signal.

Next, the signal generating apparatus 110 generates pseudo GNSS signal information from the stored GNSS navigation data by reflecting the calculated frequency shift value and the calculated C/A code phase value (S1610). The signal generating apparatus 110 determines a carrier frequency of the pseudo GNSS signal by reflecting the frequency shift value, and determines a C/A code phase value of the pseudo GNSS signal information by reflecting the C/A code phase value. The pseudo GNSS signal information may be converted into IQ phase data and may be output. The signal generating apparatus 110 may generate the pseudo GNSS signal information for each of the plurality of satellites.

Next, the signal generating apparatus 110 generates a pseudo GNSS signal, based on the pseudo GNSS signal information (S1612). The signal generating apparatus 110 may generate the pseudo GNSS signal by using SDR, or may generate the pseudo GNSS signal by using a separate analog signal generation circuit. The signal generating apparatus 110 may generate the pseudo GNSS signal from the IQ phase data.

Next, the signal generating apparatus 110 outputs the pseudo GNSS signal (S1614). The signal generating apparatus 110 outputs the pseudo GNSS signal to the signal output apparatus 120. The signal output apparatus 120 outputs the pseudo GNSS signal to the leakage cable 130. The leakage cable 130 outputs the pseudo GNSS signal through a plurality of signal leakage slots.

Embodiments may be implemented on computer-readable recording media storing instructions and data executable by computers. The instructions may be stored as program codes, and when being executed by a processor, may cause a certain program module to be generated and a certain operation to be performed. Also, when executed by the processor, the instructions may cause certain operations of the disclosed embodiments to be performed.

According to embodiments, there is provided a system for providing a GNSS signal in a space (e.g., an indoor environment or an underground facility) where a GNSS signal may not be received because line of sight communication with an artificial satellite is impossible due to an obstacle such as a roof.

Also, according to embodiments, there is provided a system for providing a GNSS signal in an indoor environment by using a general-purpose GNSS module, without changing a configuration of a receiving end of a client apparatus.

Also, according to embodiments, there is provided a system in which because a Doppler shift of an actual satellite signal is reflected when a pseudo GNSS signal is provided, during conversion from an actual GNSS signal to a pseudo GNSS signal or from a pseudo GNSS signal to an actual GNSS signal, a client apparatus may receive a GNSS signal without interruption.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A global navigation satellite system (GNSS) signal output system comprising:
    a signal generating apparatus configured to receive GNSS navigation information and generate, based on the GNSS navigation information, a pseudo GNSS signal corresponding to a current time and a current location;
    a plurality of leakage cables including a plurality of signal leakage slots; and
    a plurality of signal output apparatuses configured to receive the pseudo GNSS signal from the signal generating apparatus and output the pseudo GNSS signal to at least one of the plurality of leakage cables,
    wherein the plurality of signal output apparatuses are arranged apart from each other, and
    wherein the signal generating apparatus is further configured to:
        receive a real-time satellite signal;
        calculate, based on the real-time satellite signal, a frequency shift value of the real-time satellite signal with respect to a default carrier frequency; and
        generate, based on the GNSS navigation information and the frequency shift value, IQ phase data corresponding to the current time and the current location.

2. The GNSS signal output system of claim 1, wherein each of the plurality of leakage cables includes a plurality of leakage slots repeatedly arranged at certain intervals in an outer conductor of a coaxial cable.

3. The GNSS signal output system of claim 1, wherein two of the plurality of leakage cables running in opposite directions are connected to each of the plurality of signal output apparatuses.

4. A global navigation satellite system (GNSS) signal output system comprising:
    a signal generating apparatus configured to receive GNSS navigation information and generate, based on the GNSS navigation information, a pseudo GNSS signal corresponding to a current time and a current location;
    a plurality of leakage cables including a plurality of signal leakage slots; and
    a plurality of signal output apparatuses configured to receive the pseudo GNSS signal from the signal generating apparatus and output the pseudo GNSS signal to at least one of the plurality of leakage cables,
    wherein the plurality of signal output apparatuses are arranged apart from each other,
    wherein the signal generating apparatus is further configured to generate pseudo GNSS signals of a plurality of satellites,
    wherein the plurality of signal output apparatuses include a first group signal output apparatus and a second group signal output apparatus, wherein the first group signal output apparatus is configured to output a first pseudo GNSS signal corresponding to first-group satellites among the plurality of satellites, and the second group signal output apparatus is configured to output a second pseudo GNSS signal corresponding to second-group satellites among the plurality of satellites, and
    wherein the signal generating apparatus is further configured to output the first pseudo GNSS signal to the first group signal output apparatus and output the second pseudo GNSS signal to the second group signal output apparatus.

5. The GNSS signal output system of claim 1, wherein the signal generating apparatus is further configured to modulate at least one of a carrier signal of a GNSS L1 frequency band or a carrier signal of a GNSS L5 frequency band by using the IQ phase data to generate the pseudo GNSS signal.

6. The GNSS signal output system of claim 1, wherein the signal generating apparatus is further configured to receive the GNSS navigation information in a first period from a server providing information about a predicted future position of a GNSS satellite for a certain period of time.

7. The GNSS signal output system of claim 1, wherein the signal generating apparatus includes:
    a first communication module;
    a memory;
    a signal transmission module; and
    a first processor configured to receive the GNSS navigation information for each of a plurality of GNSS satellites from a server through the first communication module, store the received GNSS navigation information in the memory, generate the IQ phase data based on the GNSS navigation information, and control the signal transmission module to generate the pseudo GNSS signal by using the IQ phase data and to output the pseudo GNSS signal to the plurality of signal output apparatuses.

8. The GNSS signal output system of claim 1, wherein the GNSS navigation information includes at least one of pseudo random number (PRN) information of a GNSS signal to be received by the signal generating apparatus, a code frequency, a code phase, a carrier frequency, a carrier phase, a plurality of subframes, a navigation message according to time, a pseudorange in which ionospheric delay is reflected, a pseudorange rate, an azimuth, or an altitude (AZEL), or a combination thereof.

9. The GNSS signal output system of claim 1, wherein the GNSS navigation information includes receiver independent exchange format (RINEX) information.

10. The GNSS signal output system of claim 1, wherein the signal generating apparatus is further configured to calculate the frequency shift value and a coarse/acquisition (C/A) code phase value by cross-correlating a local signal with the real-time satellite signal, the local signal being generated by reflecting the IQ phase data.

11. The GNSS signal output system of claim 10, wherein the signal generating apparatus is further configured to generate the pseudo GNSS signal by reflecting the frequency shift value and the C/A code phase value in the local signal.

12. The GNSS signal output system of claim 1, wherein the signal generating apparatus and the plurality of signal output apparatuses are connected to each other by using a coaxial cable, and
    wherein the plurality of signal output apparatuses are further configured to receive the pseudo GNSS signal through the coaxial cable and output the received pseudo GNSS signal to the leakage cables.

13. The GNSS signal output system of claim 1, wherein the signal generating apparatus and the plurality of signal output apparatuses are connected to each other by using an optical cable, and wherein the plurality of signal output apparatuses are further configured to photoelectrically convert the pseudo GNSS signal received through the optical cable and output the converted pseudo GNSS signals to at least one leakage cable of the plurality of leakage cables connected to each of the plurality of signal output apparatuses.

* * * * *